(12) United States Patent
Fukuhara

(10) Patent No.: US 6,356,667 B1
(45) Date of Patent: Mar. 12, 2002

(54) ENCODING APPARATUS AND METHOD, DECODING APPARATUS AND METHOD AND RECORDING MEDIUM

(75) Inventor: Takahiro Fukuhara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,116

(22) Filed: Oct. 15, 1998

(30) Foreign Application Priority Data

Oct. 17, 1997 (JP) .............................................. 9-285447

(51) Int. Cl.[7] .............................. G06K 9/36; G06K 9/46
(52) U.S. Cl. ........................ 382/248; 382/249; 382/233
(58) Field of Search ................................ 382/232, 249, 382/248, 291, 233, 251; 358/539, 538, 426, 432

(56) References Cited

U.S. PATENT DOCUMENTS

| | | |
|---|---|---|
| 4,941,193 A | 7/1990 | Barnsley et al. |
| 5,065,447 A | 11/1991 | Barnsley et al. |
| 5,347,600 A | 9/1994 | Barnsley et al. |
| 5,917,962 A * | 6/1999 | Chen et al. .................. 382/291 |

OTHER PUBLICATIONS

Jacquin, A.E.: "Image Coding Based on a Fractal Theory of Iterated Contractive Image Transformations", IEEE Trans. on Image Processing, vol. 1, No. 1, Jan. 1992, pp. 18–30, XP002125672.

Ida T. et al.: Database Inspec Online? Institute of Electrical Engineers, Stevenage, GB, "Image decoding of fractal coding using escape–time algorithm" Database accession No. 5295141, XP002125819, & Transactions of the Institute of Electronics, Information and Communication Engineers D–11, May 1996, Inst. Electron. Inf. & Commun. Eng., Japan, vol. J79D–II, No. 5, pp. 812–818.

* cited by examiner

Primary Examiner—Phuoc Tran
(74) Attorney, Agent, or Firm—Frommer Lawrence & Haug LLP; William S. Frommer; Gordon Kessler

(57) ABSTRACT

A technique for encoding an image by splitting an input image into a plurality of first and second block portions and transform processing each second block portion. The transformed block portion most similar to a preselected first block portion and located in the same predefined area of the input image as the preselected first block is determined and the second block portion corresponding to this transformed block portion is selected. Block position information indicating the position of the selected second block portion and a transformation parameter representing the transform processing of the selected second block portion are output as the code. This code is decoded by recursively performing a transformation processing on the block indicated by the block position information and based on the transformation parameter until a predetermined condition is met for each block to be decoded within the predetermined area of the image.

26 Claims, 21 Drawing Sheets

ENCODING APPARATUS AND METHOD, DECODING APPARATUS AND METHOD AND RECORDING MEDIUM

FIELD OF THE INVENTION

This invention relates generally to an encoding method and apparatus, a decoding method and apparatus and recording medium, and more particularly to an encoding method and apparatus, a decoding method and apparatus and a recording medium usable in a system for high efficiency picture encoding or decoding for efficient picture transmission or storage.

BACKGROUND OF THE INVENTION

The International Organization for Standardization (ISO) has promulgated a standardized system for a conventional picture compression system called Joint Photographic Expert Group (JPEG). This system provides optimal encoding or decoding of pictures by applying a Discrete Cosine Transformation (DCT) to an image to transform that image into DCT coefficients. This system works most efficiently when a relatively large number of bits are to be employed to represent the encoded information. However, if the number of bits to be employed to represent the encoded information is less than a certain predetermined value, block distortion inherent in such a DCT transform becomes prevalent enough to deteriorate the quality of the picture which may be noticed by a viewer.

In response to these deficiencies of the JPEG and DCT procedure, a new Iterated Function System (IFS) picture compression technique has been proposed, and is beginning to gain favor. This IFS technique exploits self-similarity between portions of pictures and is based on fractal geometry. IFS works on the assumption that various portions of a particular picture are analogous, even though they may be of a different size, position, perspective, or orientation. IFS utilizes this redundancy in pictures to efficiently encode the picture without resulting block distortion, as may be generated in the JPEG system. Therefore, IFS is not nearly as dependent upon the number of bits to be used to represent the encoded information, and therefore the resolution during decoding does not suffer when a relatively smaller number of bits are to be used to represent the encoded information.

The basic structure of IFS is set forth in Arnaud E. Jaquin's thesis entitled "Image Coding Based on a Fractal Theory of Iterated Contractive Image Transformations", IEEE Transactions on Image Processing, Vol. 1, No. 1, pp. 18–30), and is further set forth in U.S. Pat. Nos. 5,347,600; 5,065,447 and 4,941,193, all issued to Barnsley et al. The encoding and decoding devices as generally set forth in these references will now be described with reference to prior art FIGS. 19 and 20.

Referring first to FIG. 19, the operation of an encoding device according to the prior art is shown. As is set forth in FIG. 19, an original picture 300 is entered to a block generating circuit 200 and is therein split into a plurality of blocks 301. All of blocks 301 together cover the entire original picture 300, but do not overlap with each other. Original picture 300 is also forwarded to reduced picture generating circuit 202 which produces a picture 307 having a reduced size, such as by way of a reduction scheme known in the art. The reduced picture is forwarded to and stored within reduced picture storage circuit 204.

Each of blocks 301 is forwarded to a proximate area search circuit 201 which searches reduced size picture 307 stored in reduced picture storage circuit 204 to determine whether any portions of the reduced size picture are analogous to the particular block 301 being searched. As noted above, this search includes searching for portions of reduced size picture 307 which are of different size, position, perspective, or orientation than the block 301 being searched. In accordance with the detected result indicating a successful search for a most similar portion, similar block position information 306, which specifies the position of the selected portion 305 within the reduced size picture 307, is transmitted to reduced picture storage circuit 204. In accordance with this indicated result, selected portion 305 of the reduced size picture 307 stored within reduced picture storage circuit 204 is extracted, and is transmitted to a rotation/inversion/level value conversion circuit 203.

Rotation/inversion/level value conversion circuit 203 processes portion 305 of reduced size picture 307 by a rotation/inversion/level value transformation in accordance with transformation parameters 304 which are supplied from proximate area search circuit 201. These transformation parameters 304 are indicative of the transformation which must be performed on selected portion 305 of reduced size picture 307 in order to transform that selected portion into block 301. These parameters are determined when a particular portion 305 of reduced size picture 307 is found to most closely correspond to block 301 being searched. Upon transformation by rotation/inversion/level value conversion circuit 203, a transform reduced-size picture 303 is forwarded to proximate area search circuit 201. There as a result, transformation parameters 304 and similar block position information 306 are output as ISF codes 302. Thus, a first picture is input to the system, and the output includes at least transformation parameters, for transforming a first block of that first picture into a second similar block of a reduced size picture, and position information, for determining the position of the second block within the encoded picture.

Referring next to FIG. 20, a decoding apparatus is provided in which the IFS codes recorded on, for example, a disc 400, including transformation parameters and similar block position information 302 that are output by the encoding device of FIG. 19, are entered into and stored in an IFS code storage circuit 205. IFS codes 302 are then sequentially read out from IFS code storage circuit 205 for each block, and are forwarded to an IFS code read out circuit 206. IFS code read out circuit 206 divides the codes into similar block position information 306 and transformation parameters 304 as had been produced by the encoder. Similar block position information 306 is then forwarded to reduced picture storage circuit 204 in order to reproduce the area of the reduced-size picture specified by similar block position information 306. The portion 305 of the reduced size picture stored in reduced picture storage circuit 204 corresponding to the specified area is then transmitted to a rotation/inversion/level value conversion circuit 203, and is transformed in accordance with transformation parameters 304 which are supplied from IFS code read out circuit 206. The resulting transformed picture 303 forwarded from rotation/inversion/level conversion circuit 203 is stored within decoded picture storage circuit 208. This procedure is performed for each block in the picture for which IFS codes are provided.

After all of the IFS codes for all of the blocks have been read out, IFS read out circuit 206 sends a READ OUT END notification signal 310 to duplication control circuit 207. It is then determined by duplication control circuit 207 whether information for all blocks has been obtained. If not, a repeat command 309 is sent to IFS code read out circuit 206, the IFS codes 302 are input once again, and the procedure begins again. The information for all blocks has been read out, and decoding continues through a recursive decoding procedure. Duplication control circuit 207 counts the number of recursive decoding/duplicating operations that have been executed, and if this count has not reached a predetermined value, duplication control circuit 207 sends a reprocessing command signal 311 to a switch 209 in order to send partially decoded picture 313 to reduced picture generating circuit 202 via information path 314. Reduced picture generating circuit 202 generates a partially decoded reduced size picture 315 of decoded picture 313 in a manner similar to that as in the encoding device in order to re-write the contents of the picture stored in reduced picture storage circuit 204 and to enable a next recursive decoding step to start with partially decoded reduced picture 315. If the predetermined number of recursive decoding operations have taken place, and thus the duplicating operation has been carried out the predetermined number of times, a decoded picture output control signal is sent by reprocessing command signal 311 to switch 209 in order to couple a decoded picture 313 output from decoded picture storage circuit 208 to a picture output port 316. Decoded picture 313 comprises a conglomeration picture of all of the decoded blocks noted above after being recursively decoded for a predetermined number of iterations and is read out from decoded picture storage circuit 208 in accordance with control signal 312.

While this information encoding and decoding technique has been somewhat satisfactory, it has suffered from at least one major drawback which is evident when a user wishes to decode (or encode) only a portion of a picture. In the prior art technique described above, the degree of error between a certain range block to be encoded and each of a plurality of domain blocks located at arbitrary positions throughout an entire screen picture is measured, and the domain block resulting in the smallest error, therefore being the most similar block, is selected. Thereafter, a transformed parameter and block position information are determined, and are provided as a code. A plurality of codes, one for each range block so that the range blocks comprise an entire picture, are then written into a bit stream in the order of these coded blocks.

In order to further improve encoding and transmission efficiency, and since the block size of the domain block may be variable, the words of the codes are coded in a variable length manner, i.e., variable length Huffman encoding or the like is applied to the code or codes, in order to form the bit stream. However, in these cases, if only a portion of a picture is to be decoded, it is necessary for the entire bit stream to be read out, beginning with header portion thereof, until the code corresponding to the predetermined area picture appears. Additionally, in order to decode just the desired portion of the picture, it is necessary for the entire picture to be decoded, since it is possible that the domain blocks associated with the desired range blocks may be positioned anywhere within the picture. Thus, the problem arises during high-speed processing in that a substantial portion of information which is unnecessary and unwanted may need to be decoded in order to decode a small portion of a picture as desired.

Therefore, it would be beneficial to provide an improved encoding apparatus and method that overcome the drawbacks of the prior art.

OBJECTS OF THE INVENTION

Accordingly, it is an object of the invention to provide an improved encoding and decoding apparatus and method.

A further object of the invention is to provide an improved encoding and decoding apparatus and method that allow for only a portion of an encoded picture to be decoded, as desired.

Another object of the invention is to provide an improved encoding and decoding apparatus and method in which a portion of a picture to be decoded may be extracted from a bit stream including encoded information for an entire picture without reading each portion of information in the bit stream.

A still further object of the invention is to provide a recording medium including all information for implementing an improved encoding and decoding method that allows for only a portion of an encoded picture to be decoded, as desired.

Yet another object of the invention is to provide a recording medium including all information for implementing an improved encoding and decoding method in which a portion of a picture to be decoded may be extracted from a bit stream including encoded information for an entire picture without reading each portion of information in the bit stream Still other objects and advantages of the invention will in part be obvious and will in part be apparent from the specification and drawings.

SUMMARY OF THE INVENTION

Generally speaking, in accordance with the invention, improved IFS encoding and decoding techniques are provided. The encoding technique includes the step of splitting an input image into a plurality of first and second block portions. Transform processing is performed on each second block portion, and a determination is made as to which of the transformed block portions residing in the same predefined area of the input image as a preselected first block portion is most similar to that preselected first block portion. Block position information indicating the position of the selected second block portion and a transformation parameter representing the transform processing of that selected second block portion are output as a code.

The decoding technique in accordance with the invention allows for decoding from a code representing blocks from a predetermined area of an image. The received code includes block position information indicating a position in a particular area of a picture of a pretransformed block and a transformation parameter representing the transform processing of the pretransformed block. Processing of the block identified by the block position information and based on the transformation parameter within the predetermined area is performed recursively to reconstruct a predetermined area of the decoded picture from the transformation process blocks.

A recording medium is provided for storing a computer program for operation on a general purpose computer for implementing the encoding and decoding method in accordance with the invention, and for outputting a coded bit stream in the encoding case, and a decoded predetermined area of a coded picture in the decoding case.

The several steps and the relation of one or more of steps with respect to each of the others and the apparatus embodying features of construction, combinations of elements and arrangement of parts which are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
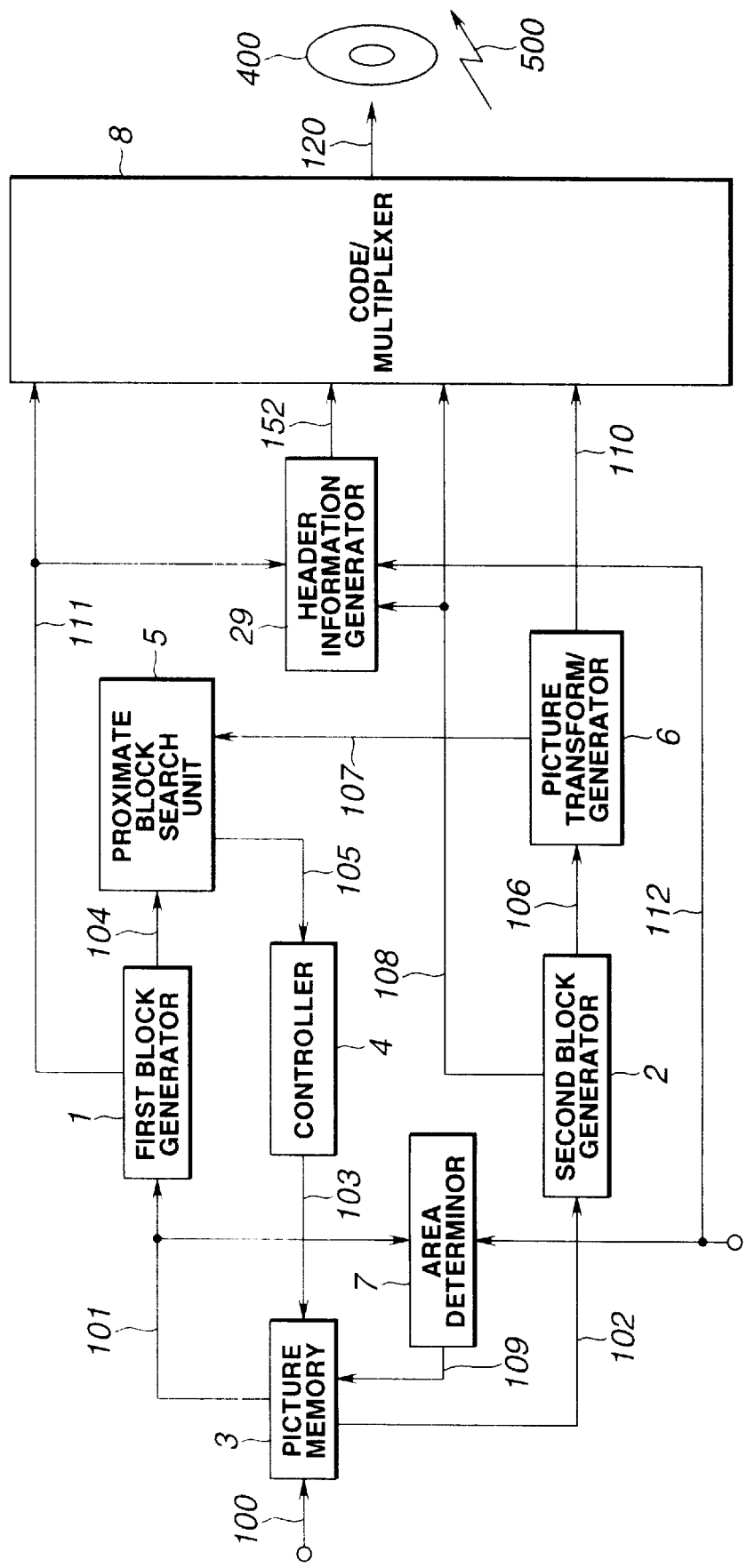
FIG. 1 is a block diagram depicting an exemplary structure of an encoding device constructed in accordance with a first embodiment of the invention.

Referring first to FIG. 1, an encoding device constructed in accordance with a first embodiment of the invention includes a picture memory 3 for receiving and storing an input picture 100, a first block generator 1 for generating a plurality of first block portions and a second block generator 2 for generating a plurality of second block portions, each of which receives input picture 100 as a first input picture 101 and a second input picture 102, respectively, and a controller 4 for generating a control signal 103 to control the reading of first and second input pictures 101 and 102 from picture memory 3. In a preferred embodiment, the second block portions are twice the size of the first block portions. A picture transformation generator 6 for transforming a plurality of second block portions 106 received from second block generator 2 is provided. These transformed block portions 107 are forwarded to a proximate block search unit 5 which searches for a second transformed block portion 107 received from second block generator 2 that is most similar to a first block portion 104 received from first block generator 1. Proximate block search unit 5 outputs a control signal 105 to controller 4 to prompt the system to output the next portion of picture 100 from picture memory 3. An area determiner 7 receives input picture 101 and divides that input picture into a plurality of areas based upon an external input. Depending upon the location of the first block to be searched, area determiner 7 outputs a control signal 109 to picture memory 3 to output only a portion of input picture 100 as input picture 102 corresponding to the area of picture 100 that includes the first block to be searched. In this manner, only second block portions 106 in the same area of picture 100 as first block portion 104 to be searched will be transformed and searched. It is therefore guaranteed that in all cases for all first block portions 104, the corresponding transformed, most similar second block portion 107 will lie in the same area of picture 101.

A header information generator 29 receives a first block number or address 111 from first block generator 1, a corresponding second block number or address 108 from second block generator 2 and screen splitting information 112 from the same external input that provides this information to area determinator 7, in order to generate header information 152. The first block portion number or address 111, the second block portion number or address 108, the associated transform parameter 110 indicative of the transformation of the selected second block portion 106 to result in the corresponding first block portion 104, and header information 152 are forwarded to encoder/multiplexer 8 which provides a final encoded output 120 to be recorded on a recording medium 400 or to be transmitted over a communication network 500.

Figure 4:
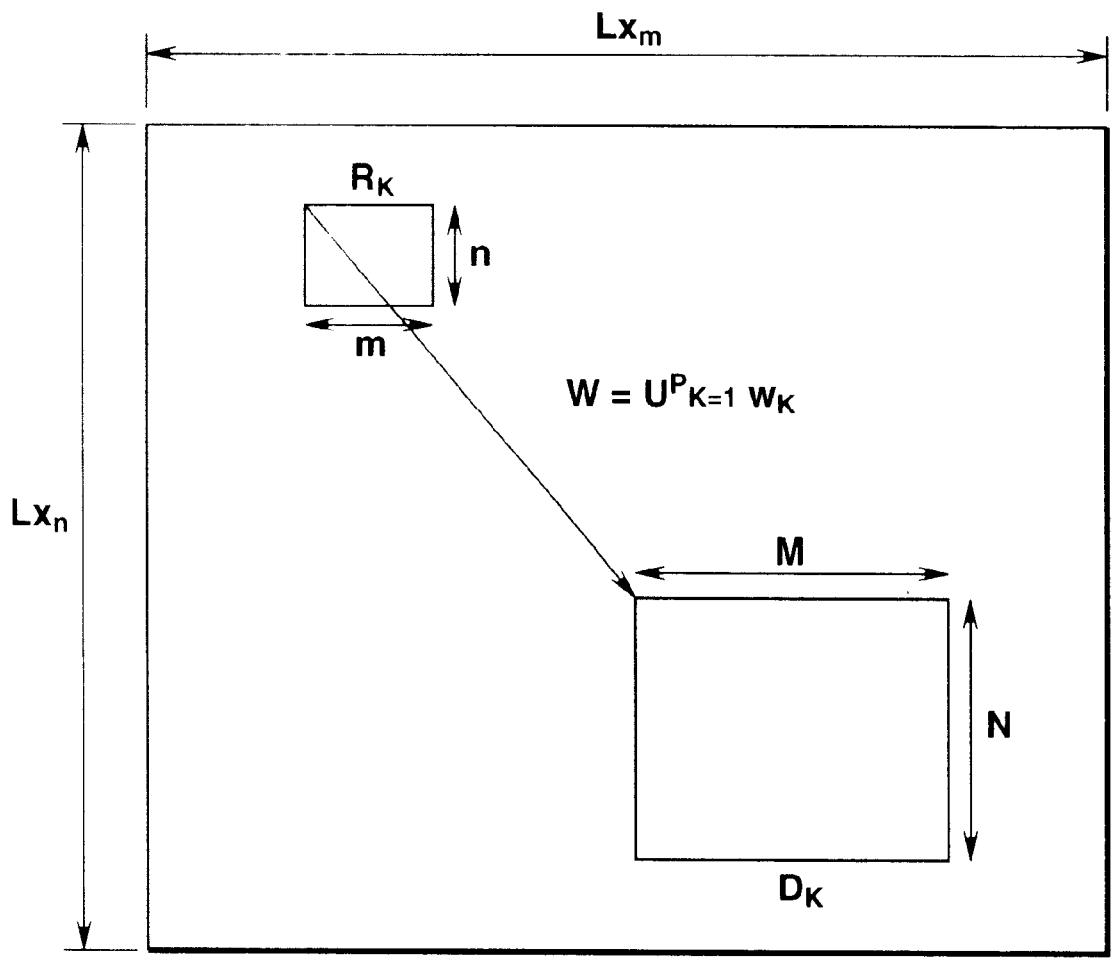
FIG. 4 depicts a mapping process between picture blocks in accordance with the invention.

Referring next to FIG. 4, the basic theory of the iterative transforming coding characteristic of the present invention will be explained. Iterative transform encoding is a technique which is performed by repeatedly executing contractive mapping from a domain block to a range block for all range blocks making up a full picture. This mapping may include transforming the domain block in any number of ways including rotation, lateral or vertical movement, enlargement or contraction, or change of perspective or orientation. Once a domain block closest to the range block is found (i.e., generates the least difference data), the range block is encoded by IFS coding according to the procedure described below. Only the transition parameters and position information of the domain blocks which are most similar to the corresponding range blocks need be encoded. As is shown in FIG. 4, a range block $R_k$ corresponds to a first block portion 104 while the domain block $D_k$ corresponds to a second block portion 106. The block size of $R_k$ is m×n, while that of $D_k$ is M×N. As is also shown in FIG. 4, there are L×L first range blocks. The setting of the size of the range block and the domain block is significant since these block sizes influence the encoding efficiency significantly.

The block picture transformation sequence that takes place within picture transformation generator 6 is the transform from block $D_k$ to block $R_k$. Therefore, if the mapping function to the block k is $w_k$, and the number of blocks of the second block picture required in mapping the entire full picture is P, the picture f is mapped to $$W(f)=w_1(f) \cup w_2(f) \cup \ldots \cup Ew_p(f) \quad (1)$$

by the mapping function w of the entire picture. Therefore, W is represented by the following equation (2):

$$W = \bigcup_{k=1}^{P} w_k \quad (2)$$

It does not matter which type of the mapping function W is used, as long as the function is a converging function. In general, contractive mapping is used for assuring the convergence.

In addition, affine transformation is used in view of its simplicity in processing. The case of mapping block $D_k$ to block $R_k$ by affine transformation can be expressed by the following equation (3)

$$v_i(x, y) = \begin{bmatrix} a_i & b_i \\ c_i & d_i \end{bmatrix} \begin{bmatrix} x \\ y \end{bmatrix} + \begin{bmatrix} e_i \\ f_i \end{bmatrix} \quad (3)$$

The transformation between two blocks, such as transformation including rotation, lateral or vertical movement, contraction or enlargement, can be represented fully by this equation (3), each of the parameters indicating various transformations, as is well known in the art. Thus, (x,y) represents the coordinates of a point before affine transformation while $(a_i x+b_i y+e_i, c_i x+d_i y+f_i)$ represent the coordinates of a point after transformation denoted as $v_i(x,y)$.

Picture transformation generator 6 (FIG. 1) includes circuits or processing modules for transformation, such as rotation, lateral or vertical movement, contraction or enlargement, and can therefore perform all of the functions that are represented in equation (3). By way of example, as is shown in FIG. 4, the upper left corner of the domain block $D_k$ is mapped to the upper left corner of range block $R_k$. The transformation of the gray tone values of pixels in a block picture are similarly realized by an affine transformation as noted above.

For each second block portion 106 being read out from picture memory 3 and second block generator 2, one or more of a plurality of transformation coefficients ($a_i$, $b_i$, $c_i$, $d_i$, $e_i$, $f_i$) of equation (3) can be changed in a plurality of ways to alter the transform applied to the second block portion 106 by picture transformation generator 6. The plurality of second block portions 106 generated from second block generator 2 are transformed in various ways to obtain a plurality of transformed block portions 107. Of these plural transformed block portions 107, the transformed block portion closest to the one first block picture 104 is detected by proximate block search unit 5.

Figure 2:
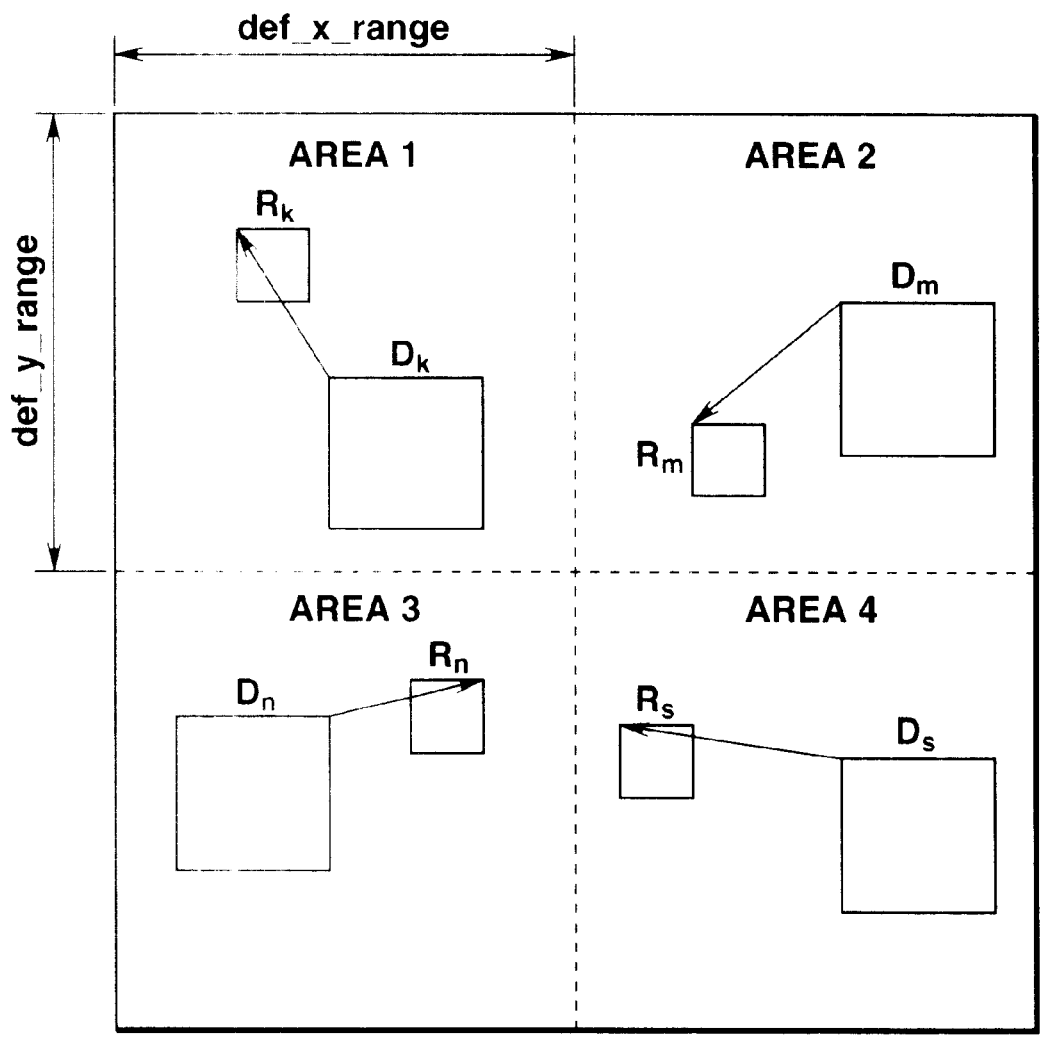
FIG. 2 depicts a mapping process between picture blocks for a plurality of predefined areas of the picture in accordance with the first embodiment of the invention.

The operation of the encoding device of FIG. 1 constructed in accordance with the first embodiment of the invention will now be described, making further reference to FIG. 2. Digitized picture 100 is input to picture memory 3 and is stored therein. Under the control of controller 4, first input picture 101 is supplied to first block generator 1 and area determiner 7. Area determiner 7 receives screen splitting information 112 from the external source, and thereafter determines the area of second input picture 102 which is to be read out from picture memory 3 to second block generator 2. This area is determined so that the portion of second input picture 102 forwarded to second block generator 2 corresponds to the same area of input picture 100 in which the first block to be tested from first input picture 101 is located. By way of example, if the block to be tested in read out first picture 101 is located in area 1 of FIG. 2, the portion of second input picture 102 read out from picture memory 3 will include all portions of area 1, but no portions of the picture from any additional areas. In this example, only the portion of input picture 100 corresponding to area 1 will be forwarded to second block generator 2. Thus, while in the prior art, a domain block can be positioned anywhere in the image for a particular range block, in the present invention, the domain block must be positioned in the same area of picture 100 as the associated range block. Therefore, it is ensured that the eventual second transform block portion 107 utilized to encode the corresponding first block portion 104 will be located in the same area of input picture 100. By way of example, as is shown in FIG. 2, area determiner 7 splits the screen shown in FIG. 2 both vertically and horizontally in accordance with screen splitting information 112. While the screen splitting information in this example indicates the screen should be split vertically into upper and lower portions, and horizontally into left and right portions, screen splitting information 112 from the external input can split the screen into any number of areas, and in any desired combination.

In this example, the screen is split into four areas, area 1–area 4, each having a lateral width of def_x_range and a longitudinal width of def_y_range. Further in accordance with the invention, in the first area, a range block (first block) $R_k$ corresponding to a domain block (second block) $D_k$ is selected. In the second area, a range block (first block) $R_m$ corresponding to a domain block to a domain block (second block) $D_n$ is selected. In the third area, a range block (first block) $R_n$ corresponding to a domain block (second block) $D_n$ is selected. Finally, in the fourth area, a range block (first block) $R_s$ corresponding to a domain block (second block) $D_s$ is selected. During operation, a transformation is performed on each of these domain blocks (second blocks) corresponding to the range block (first block) in the same area by mapping. As noted above, the domain block corresponding to each particular selected range block is positioned within the same area as the corresponding range block. Thus, in accordance with the invention, iterated function coding is independently carried out in each area of the picture. The transform/encoding operation (as set forth in FIG. 4) is independently performed on each defined area in the picture.

Figure 3:
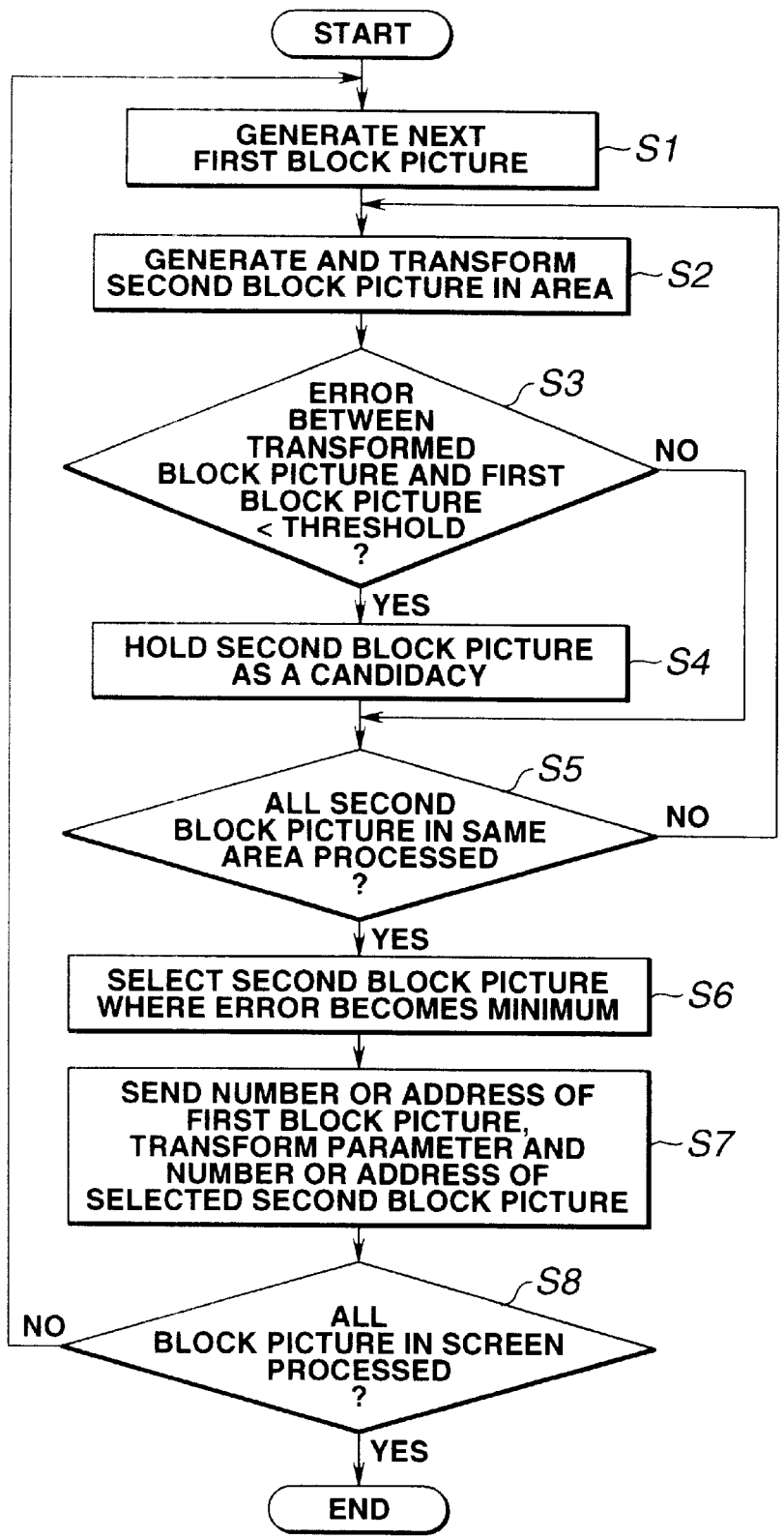
FIG. 3 is a flowchart showing a series of steps of the encoding method for encoding a predetermined target area of a picture in accordance with the first embodiment of the invention.

The transform/encoding operation which is carried out for each area will now be described with reference to the flow chart of FIG. 3.

At the first step S1, a first block picture is split (generated) from the picture 100 stored in picture memory 3, producing a plurality of first block portions 104. At the next step S2, a second block portion 106 located within the same defined area of input picture 100 as the first block picture is split (generated) from the picture 100 stored in picture memory 3 and is transformed according to a defined transform procedure, generating transformed second block portion 107. Then, processing transfers to inquiry S3.

At this inquiry S3, a comparison is performed by proximate block search unit 5 to determine whether the current transformed second block portions 107 within the same area of input picture 100 as the selected first block portion 104 is the most similar to the selected one of the plurality of first block portions 104 generated at step S1. This comparison is performed by taking the absolute value sum of error between each corresponding pixel of the current first and second block portions. The comparison between block portions may also be made by using the square sum of error, in an alternative embodiment. Inquiry is made as to whether the calculated error between the current block portion is less than a predetermined threshold. If answered in the affirmative, this block portion is stored as one candidacy of the most similar block portion in step S4, and operation proceeds to inquiry S5. If answered in the negative, operation proceeds to inquiry S5.

Inquiry S5 determines whether all of the second block portions 106 positioned within the same area as the selected first block portion 104 being searched have been processed. If all the second block portions 106 in this area have not been processed, operation returns to step S2, and a next second block portion 106 within the selected area of picture 100 is generated and transformed in accordance with step S2. However, if all of the second block portions 106 within the predefined area have been processed, the operation proceeds to step S6 where the second block portion having a minimum error is selected from the candidates of the second block portions 106 which were temporarily stored. Operation then proceeds with step S7 in which the transform parameter 110 from picture transform generator 6 and the number address from the second block generator corresponding to the selected second block portion 106, along with the number or address 111 of the first block portion 104 from the first block generator are forwarded to the coding/multiplexer 8. Operation then proceeds to inquiry S8.

Inquiry S8 determines whether all of the first block portions 104 within the screen have been processed, or at least whether all first block portions 104 within the area of the screen that the user wishes to encode have been processed. If this inquiry is answered in the negative, control is passed back to step S1, where a next first block portion 104 is generated. If this inquiry is answered in the affirmative, the procedure comes to an end since the entire screen has been encoded.

Thus, in accordance with the invention, as is shown in FIG. 2, each area is individually IFS encoded according to the procedure described above with respect to FIG. 4.

Figure 14:
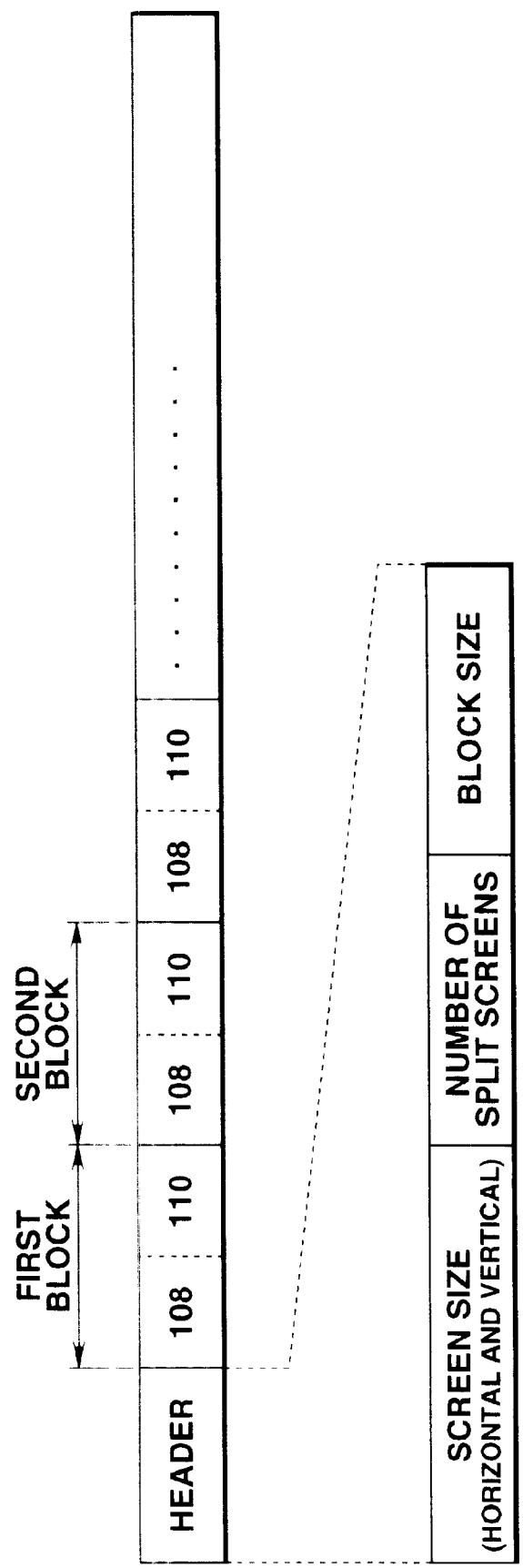
FIG. 14 depicts the structure of an encoded bit stream and header portion thereof in accordance with the invention.

Referring once again to FIG. 1, header information generator 29 receives the number or address 111 of first block portion 104, the number or address 108 of second block portion 106 and the screen splitting information 112 received from the external input source. In accordance with screen splitting information 112, header information generator generates information indicating screen size, the number of split screens and their sizes in accordance with the screen splitting information 112, and the size of the block for the data representing each of the first block portions 104 and the second block portions 106 in accordance with the number or address 111 of the first block portions 104 and the number or address 108 of the second block portions 106, all as shown in FIG. 14. Code length for each code is important because in accordance with the invention, a fixed length coding scheme, rather than a variable length data size is utilized. This fixed length coding allows random, immediate access to any particular first block portion information since the location thereof is known. Thus, the second block portion address 108 and transformation parameter 110 for each first block portion 104 will always be positioned in the same location in the data stream, and can be easily accessed. If a variable length encoding scheme were utilized, it would be necessary to read the entire stream of data in order to arrive at a particular selected block. In accordance with the invention, when only a particular portion of an image is to be decoded, it is possible to address immediately the necessary blocks in the coded information data stream in order to decode the appropriate areas of the picture including the portion of the picture which is to be displayed.

Upon receipt of the header information from header information generator 29, coding/multiplexer 8 receives the number or address 111 of the first block portion 104, the number or address 108 of the selected second block portions 106 and the transform parameter 110 associated therewith for each first block 104 portion in turn, and multiplexes the header information 152 and the transform parameter 110, the number or address 108 of the selected second block portion 106 corresponding to each first block portion 104 in order of the number or address 111 of the first block portion 104. This information is code/multiplexed by coding/multiplexer 8 in a predetermined order using fixed length encoding, and a coded bit stream 120 is output therefrom. This output coded bit stream 120 may be recorded on a recording medium 400 such as a CD-ROM, or transmitted over a communication network 500.

Figure 5:
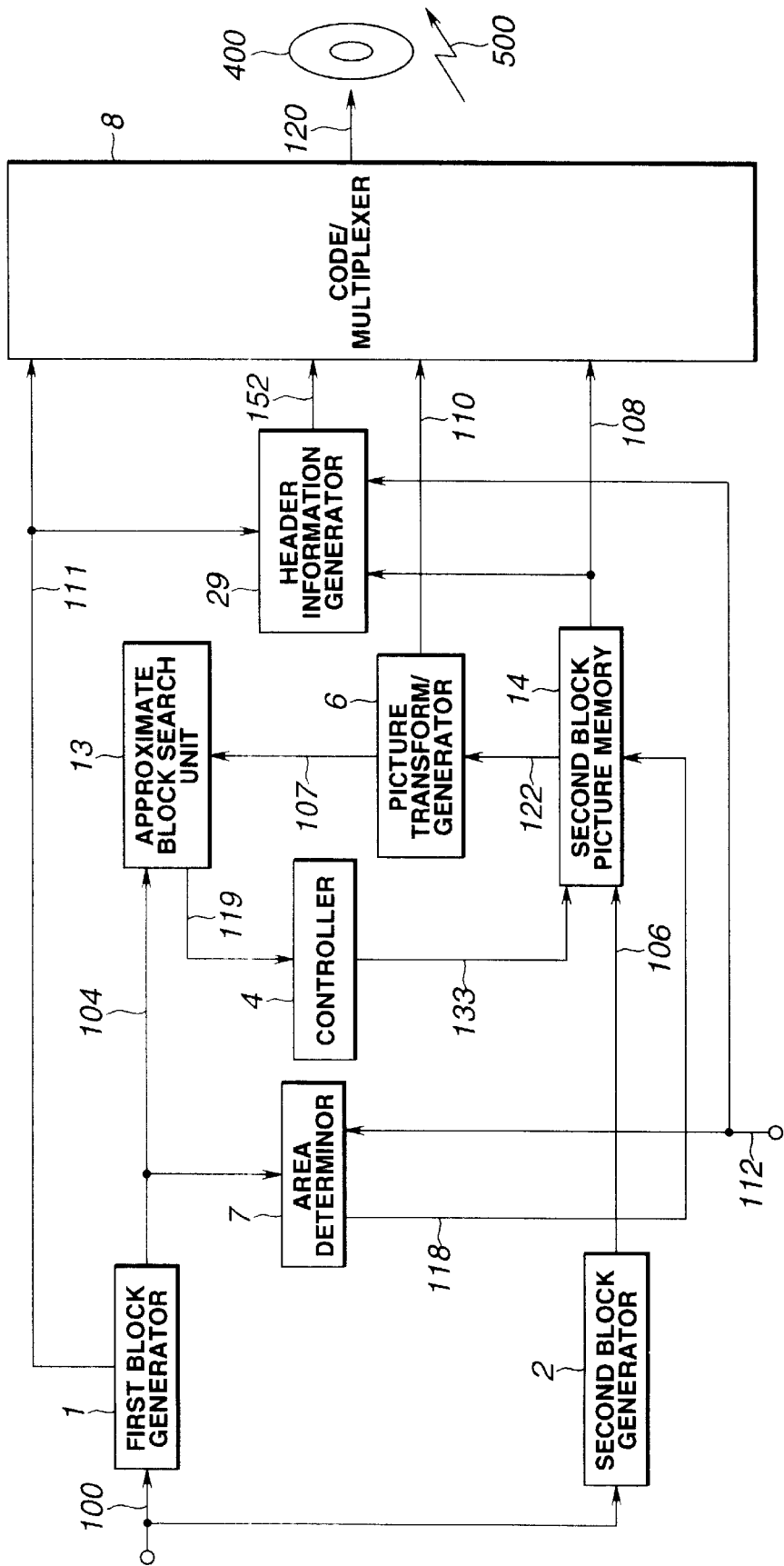
FIG. 5 is a block diagram depicting an exemplary structure of an encoding device constructed in accordance with a second embodiment of the invention.
Figure 6:
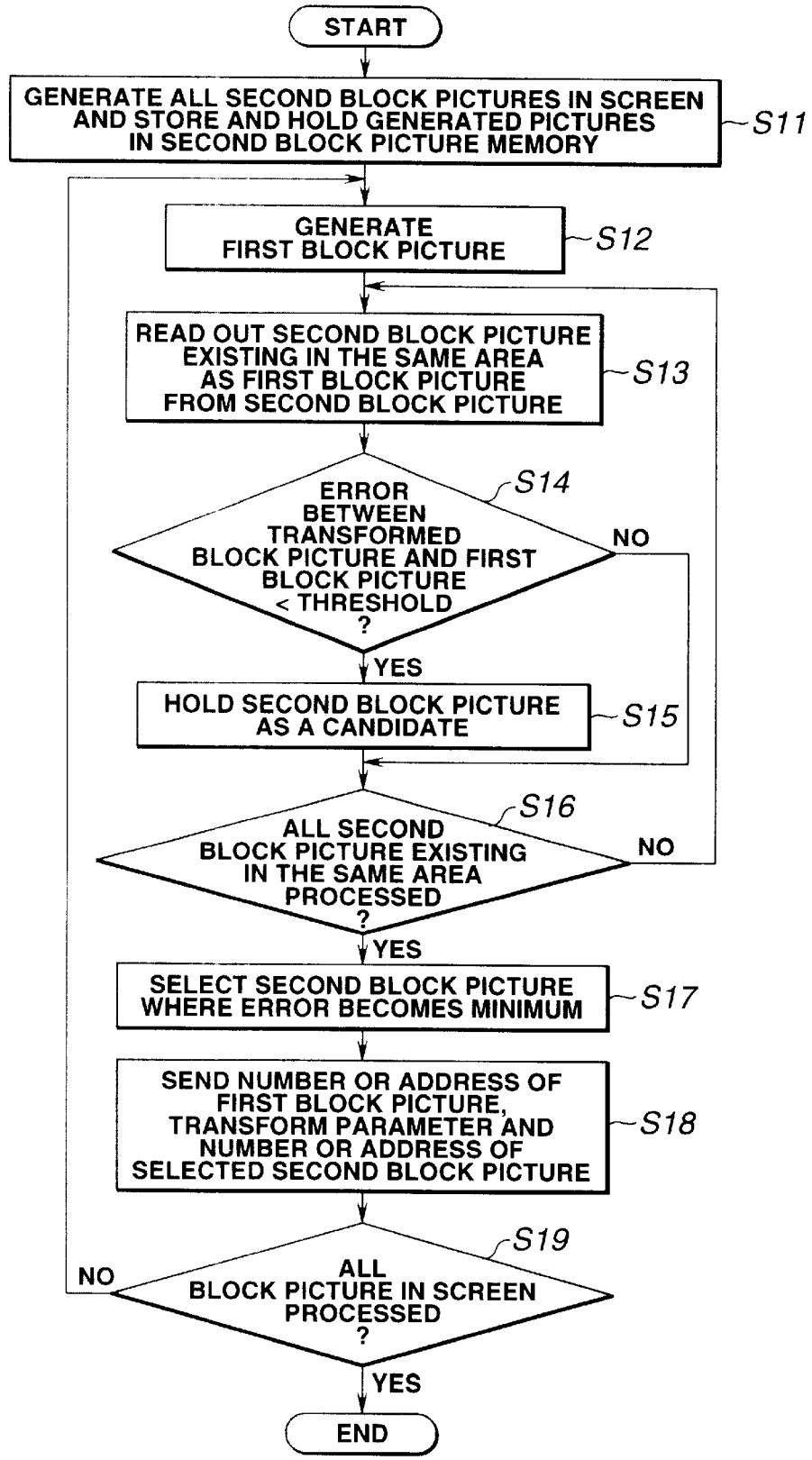
FIG. 6 is a flowchart showing a series of steps of the encoding method for encoding a predetermined target area of a picture in accordance with the second embodiment of the invention.

Referring next to FIGS. 5 and 6, an encoding apparatus and method constructed in accordance with a second embodiment of the invention will be described. Elements similar to those set forth in the first embodiment are denoted by similar reference numerals.

The encoding device constructed in accordance with the second embodiment includes a first block generator 1 for generating a plurality of first block portions 104 from a received input picture 100, a second block generator 2 for generating a plurality of second block portions 106 from a received input picture 100 and a second block picture memory 14 for storing the plurality of second block portions 106 generated from second block generator 2. The encoding device further includes a picture transform generator 6 for carrying out a predetermined transform on a second block portion 122 of second block picture 106 received from second block picture memory 14. Also included is an approximate block search unit 13 for searching for a transformed second block portion 107 received from picture transform generator 6 which is most similar to the selected first block portion 104 received from first block generator 1. A controller 4 is also provided for generating control signal 133 for controlling the transmission of transformed second block portions 122 to picture transform generator 6 to perform the search therein. An area determiner 7 is provided for determining an area of picture 100 from which the second block portions 106 are to be supplied to the picture transform generator 6. This area is selected so that the first block portion 104 received from first block generator 1 is positioned within the same area of picture 100 as the plurality of second block portions 106. This information is determined by area determiner 7 using screen splitting information 112 received from an external input.

Area determiner 7 generates a control signal 118 to select the second block portions 106 which are positioned in the same area of picture 100 corresponding to first block portion 104. A header information generator 29 is also provided for receiving the number or address of first block portion 111 from first block generator 1 and the number or address 108 of the second block portion 106 selected by the approximate block search unit 113 as being most similar to first block portion 104, and screen splitting information 112 to generate header information 152, which is forwarded to coding multiplexer 8. Coding multiplexer 8 receives the block numbers or addresses of the first and second block portions 111 and 108, transform parameter 110 from picture transform generator 6 and indicative of the transform which must be performed on the selected second block portion 106 to transform that selected second block portion into first block portion 104, and header information from header information generator 29. The coding multiplexer 8 provides a final encoded output 120 to be recorded on a recording medium 400 or transmitted over a communication network 500.

The operation of the encoding device constructed in accordance with the second embodiment of the invention will now be described with reference to the flowchart of FIG. 6. At the first step, S11, all of the second block portions 106 that make up picture 100 are sequentially generated prior to generation of any of the first block portions 104, and are stored and held in second block picture memory 14. Then, at step S12, the first block portion 104 of the coding target (the first block picture in the area of picture 100 which is to be decoded) is generated. Thus, at steps S11 and S12, a digitized picture 100 is input to first block generator 1 and second block generator 2, where the first block portion 104 and the plurality of second block portions 106 are generated, respectively. Operation proceeds to step S13. From this step S13, the encoding technique of the second embodiment is similar to that discussed above with respect to the first embodiment. Specifically, in step S13, area determiner 7 determines from among, the predefined areas into which the entire screen has been divided in accordance with screen-splitting information 112, the area of picture 100 in which the first block portion 104 is located. Then, a second block portion 122 located in the same area of picture 100 as the area where first block portion 104 is located is read out from second block picture memory 14 and is transformed by picture transform generator 6. Operation then proceeds to step S14.

At steps S14 to S16, approximate block search unit 13 compares the transformed second block portion 107 transformed at step S13 and the first block portion 104. This comparison is performed to determine which second block portion 122 has the least error between it and the first block portion 104 to be coded. From among all of the second block portions 122 in the candidate area of picture 100, the number or address 108 and the transform parameter 110 of the second block portion 122 having the minimum error between the second block portion 122 and the first block portion 104 is selected. This selection process is performed (as noted with respect to the first embodiment), wherein the error for a transformed second block portion 107 to be tested is compared with a threshold value. If the error is smaller than the threshold, then operation proceeds to step S15, and the second block portion 122 is stored as a candidate for the most similar second block portion. The transform parameter 110 and the number or address 108 of the selected second block portion 122 are temporarily stored. Operation then proceeds to inquiry S16. Also from S14, if the error is not smaller than the threshold or the previous smallest error, operation proceeds to inquiry S16. Inquiry S16 determines whether all of the second block portions 122 in the defined area containing first block portion 104 have been processed. If all the second block portions 122 in the defined area of picture 100 have not been processed, control signal 119 is generated and transmitted to controller 4 from the approximate block search unit 13, control returns to step S13, and a next second block portion 122 is read out from the second block picture memory in response to control signal 133 generated from the controller 4. If all of the second block portions 122 within the same area of picture 100 as first block picture 104 have been processed, control signal 119 is generated and transmitted to controller 4 from the approximate block search unit 13. Operation then proceeds to step S17.

At step S17, in response to the control signal 133, transform parameter 110 and the number or address 108 of the second selected block portion 122 having minimum error between the data of the second block portion and the first block portion 104 are selected of all of the candidates of the second block portions 106 which were temporarily stored. The operation then proceeds to step S18 whereat the selected transform parameter 110 from picture transform generator 6, the selected number or address 108 of the selected second block portion 122 and the number or address 111 of the first block portion are sent to the coding multiplexer 8. Operation then proceeds to S19 to inquire whether all of the first block portions 104 in the picture 100 have been processed. If not, control returns to step S12 to generate an additional first block portion 104. If all first block portions 104 have been processed, the procedure ends since an entire screen has been encoded.

Figure 7:
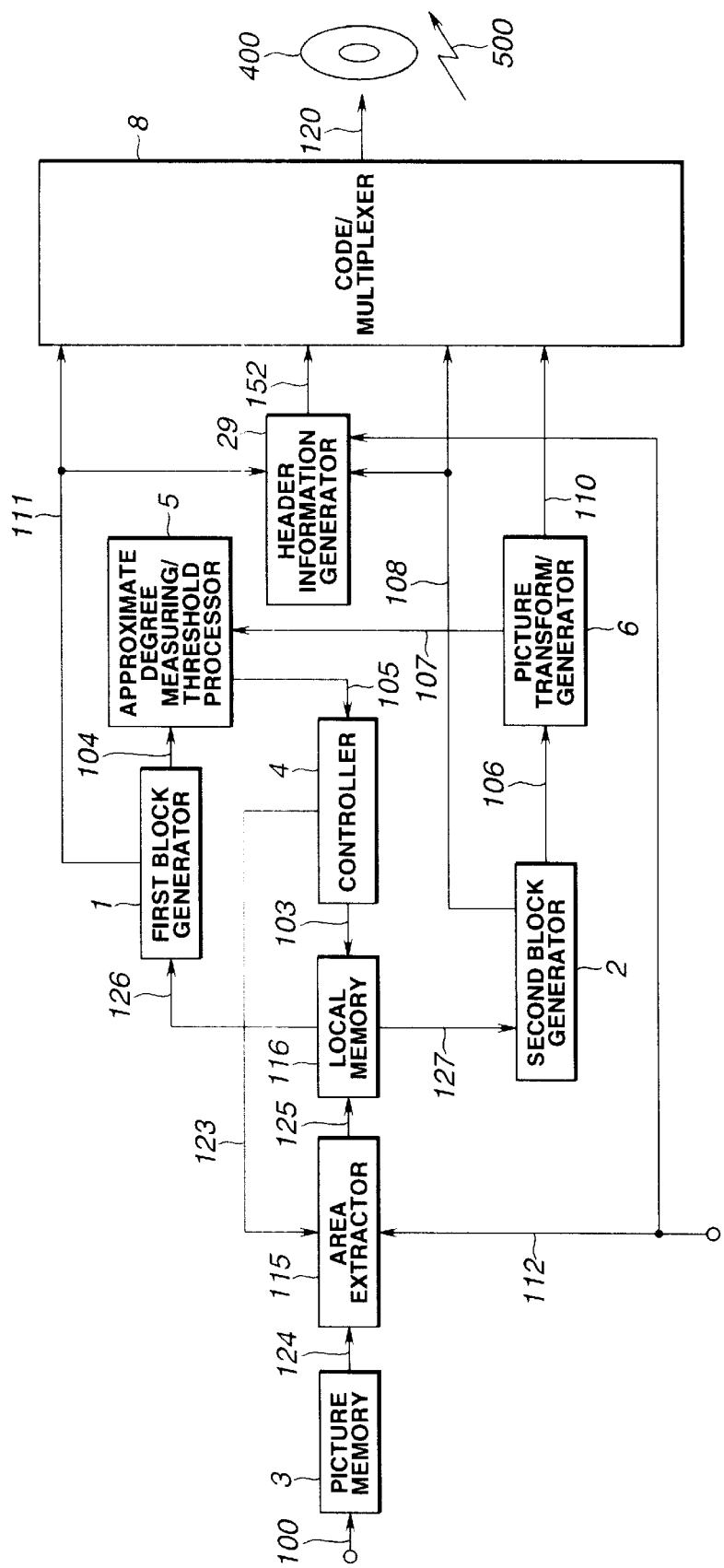
FIG. 7 is a block diagram depicting an exemplary structure of an encoding device constructed in accordance with a third embodiment of the invention.

Referring next to FIG. 7, an encoding apparatus constructed in accordance with a third embodiment of the invention will now be described. The encoding apparatus depicted in FIG. 7 is similar to the apparatus described above, but includes an area extractor 115 for extracting an area from picture 100 instead of the area determiner 7, and a local memory 116 for storing the area extracted by the area extractor 115. The remainder of the elements are similar to those set forth in the previously described embodiments, and therefore, are denoted by similar reference numerals. The operation of the encoding device constructed in accordance with this third embodiment will now be described. In this encoding device, a digitized picture 100 is input to picture memory 3. Only a particular area 124 of picture 100 is read out from picture memory 3 based upon picture splitting information 112. This read out area 124 of picture 100 from picture memory 3 is forwarded as area picture 125 to local memory 116. In accordance with a reading control signal 103 received from controller 4, a first picture 126 and a second picture 127 are output from local memory 116 to first block generator 1 and second block generator 2, respectively. Thereafter, the processing of a first block portion 104 and a second block portion 106, which are generated by the respective first and second block generators 1 and 2, is substantially similar to the processing described with respect to the first embodiment. After all of the first block portions 104 included within the area picture 125 are encoded, if another portion of picture 100 is to be coded, another area picture 125 may be extracted in a similar fashion from picture memory 3 by area extractor 115 in accordance with reading control signal 123 from controller 4. This additional area will then be stored in local memory 116, and a similar operation as noted above will be carried out.

Figure 8:
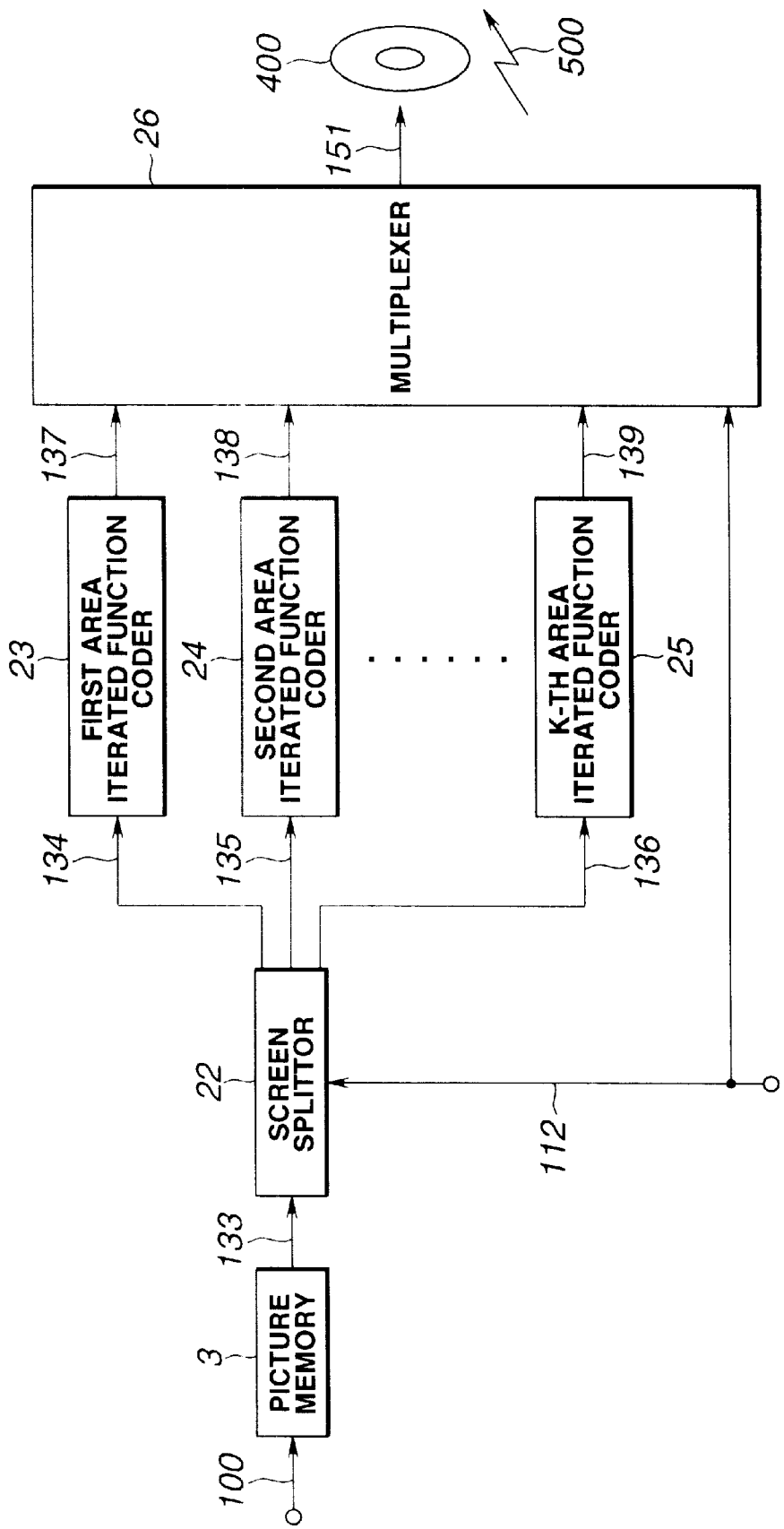
FIG. 8 is a block diagram depicting an exemplary structure of an encoding device constructed in accordance with a fourth embodiment of the invention.

Referring next to FIG. 8. an encoding apparatus constructed in accordance with a fourth embodiment of the invention will now be described. As is shown in FIG. 8, the encoding device constructed in accordance with the fourth embodiment of the invention includes a picture memory 3 for storing an input picture 100, a screen splitter 22 for splitting the screen of picture 100 into a plurality of predetermined areas in accordance with screen splitting information 112 received from an external input source, a first area iterated function coding section 23 for carrying out iterated function coding with respect to a first predefined area, a second area iterated function coder 24 for carrying out iterated function coding with respect to a second predefined area, and other area iterated function coding sections represented generally by a K-th area iterated function coding section 25 for carrying out iterated function coding with respect to a K-th predetermined area. The elements included in each iterated function coder area are identical. A multiplexer 26 is also provided for multiplexing header information and the coded bit stream from each of the predefined areas.

The operation of the encoding device of FIG. 8 will now be described. In this encoding device, after a digitized picture 100 is input and stored in picture memory 3, picture 100 is forwarded to screen splitter 22 whereat the entire screen of picture 100 is split into a plurality of areas in accordance with the screen splitting information 112 received from the external input. By way of example. in FIG. 8, the screen is split into K areas. Split area pictures 134, 135, . . . 136 are forwarded to first, second, . . . and K-th iterated function coder areas 23, 24, . . . 25, respectively. In each of the areas, iterated function coding is carried out independently. By way of example, if K is equal to 4, the input picture is divided into four areas. The first iterated function coder 23 performs iterated function coding on an image of area 1 (as shown in FIG. 2), the second area iterated function coder 24 performs iterated function coding on an image of area 2, and so on, with the K-th area iterated function coder 25 performing the iterated function coding on an image of area 4. Coded bit streams 137. 138, . . . 139 are output respectively from first, second, . . . K-th area iterated function coders 23, 24, . . . 25. Screen splitting information 112 is also forwarded to multiplexer 26 along with the coded bit streams. Multiplexer 26 then generates header information and multiplexes the header information and coded bit streams 137, 138 and 139, and transmits this multiplexed information as a coded bit stream 151.

Figure 9:
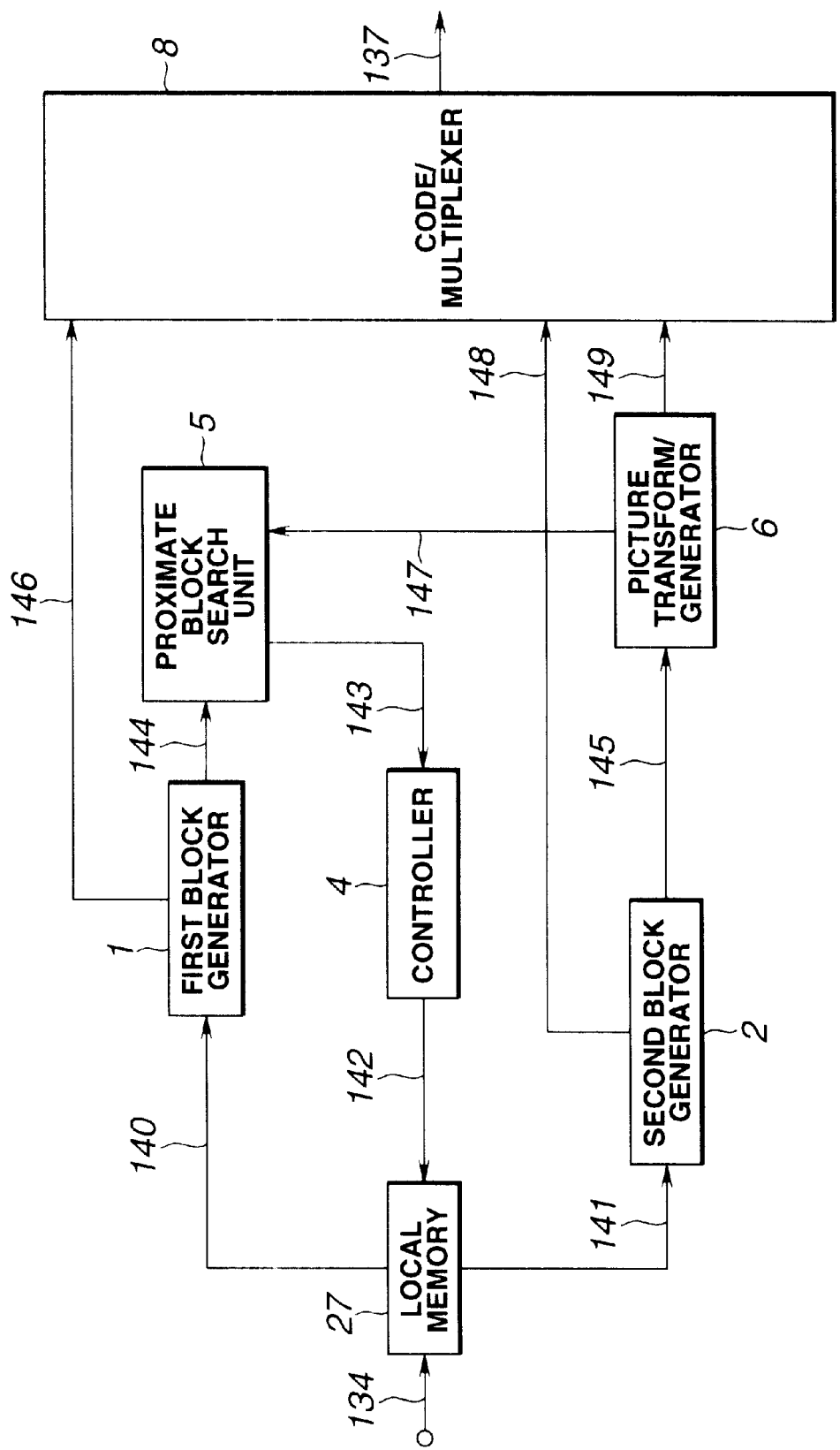
FIG. 9 is a block diagram depicting the internal structure of each of the iterated function coders of FIG. 8.

FIG. 9 depicts the internal structure of the first area iterated function coder 23. Each of the other area iterated function coders are formed of the same internal structure. In the area iterated function coder of FIG. 9, a first area picture 134 is input to a local memory 27, and first picture 140 and second picture 141 are read out from local memory 27 in accordance with a control signal 142 from controller 4, as prompted by signal 143 from proximate block search unit 5, and are output to first block generator 1 and second block generator 2, respectively. The remainder of the processing is similar to that set forth with respect to the embodiments discussed above, including the generation of a plurality of first block portions 144, the generation of a plurality of second block portions 145, the transformation of these second block portions 145 by picture transform generator 6 into transformed second block portions 147, the determination in proximate block search unit 5 of minimum error, and the multiplexing and output of the information as encoded data stream 137 by coding/multiplexer 8. This embodiment is characterized in that high speed coding is carried out by parallel processing by a plurality of coding sections as opposed to the sequential coding carried out in the prior embodiments. Thus, encoding can take place at a much higher rate.

Figure 10:
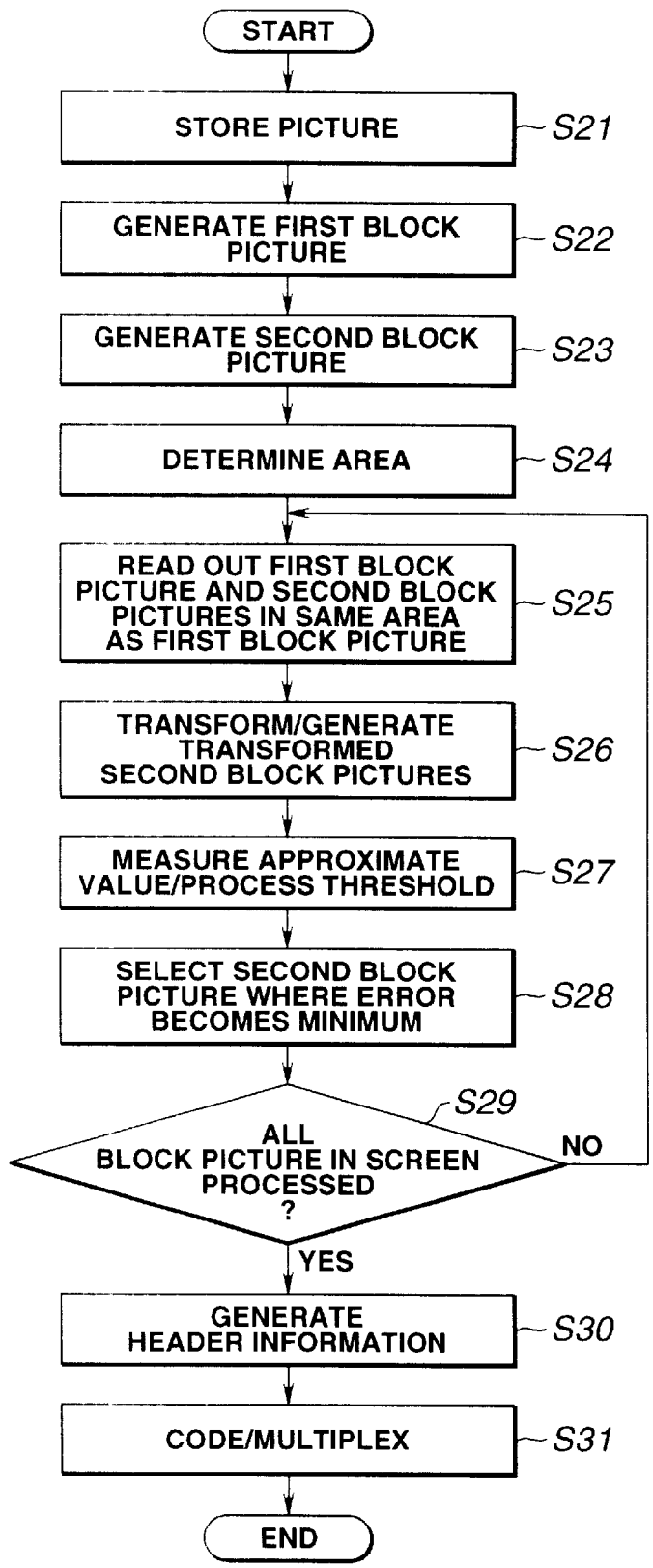
FIG. 10 is a flowchart showing a series of steps of the encoding method for encoding a predetermined target area of a picture in accordance with the fourth embodiment of the invention.

Referring next to FIG. 10, a method for implementing a fifth encoding embodiment of the invention is depicted. In FIG. 10, the flowchart set forth may be programmed into a general purpose computer. In this program, at the first step S21, an input picture is stored in a frame memory in the general computer. At the next step, S22, the picture stored at step S21 is split to generate a plurality of first block portions.

At the subsequent step S23, the picture stored at step S21 is similarly split to generate a plurality of second block portions. Thereafter, operation proceeds to step S24 which determines all of the second block portions that belong to the same area as each of the first block portions. Thereafter, at step S25, a first block portion stored and produced at step S22, and all of the second block portions produced at step S23 that are positioned in the same predetermined area as the first block portion, are read out. Then, operation proceeds to step S26 in which each of the second block portions which is read out at step S25 is transformed. At the subsequent step S27, a determination is made as to which of the transformed second block portions is closest to the selected first block portion, i.e., which of the second block portions has the least error between it and the selected first block portion. This determination is made utilizing the threshold processing noted above with respect to the first embodiment, and at step S28, the second block portion having the minimum error is selected. The number or address and the transform parameter corresponding to this selected second block portion and the number or address of the first block portion are generated and stored. The operation then proceeds to inquiry S29 which determines whether all of the first block portions of the input picture have been encoded. If all of the first block portions have not been encoded, the operation returns to step S25, and the next first block portion is read out and the foregoing operation is performed. If all first block portions have been encoded, operation proceeds to step S30 which generates header information including information indicating a screen size, number of split screens and block size of the first and second block portions are formed into a header, such as that shown in FIG. 14. Thereafter, at step S31, each of the block numbers or addresses and the transform parameters obtained in the transform generation of the transformed second block portions corresponding to the first block portions and the generated header information are coded/multiplexed and transmitted. On completion of this step S31, processing ends.

Figure 15:
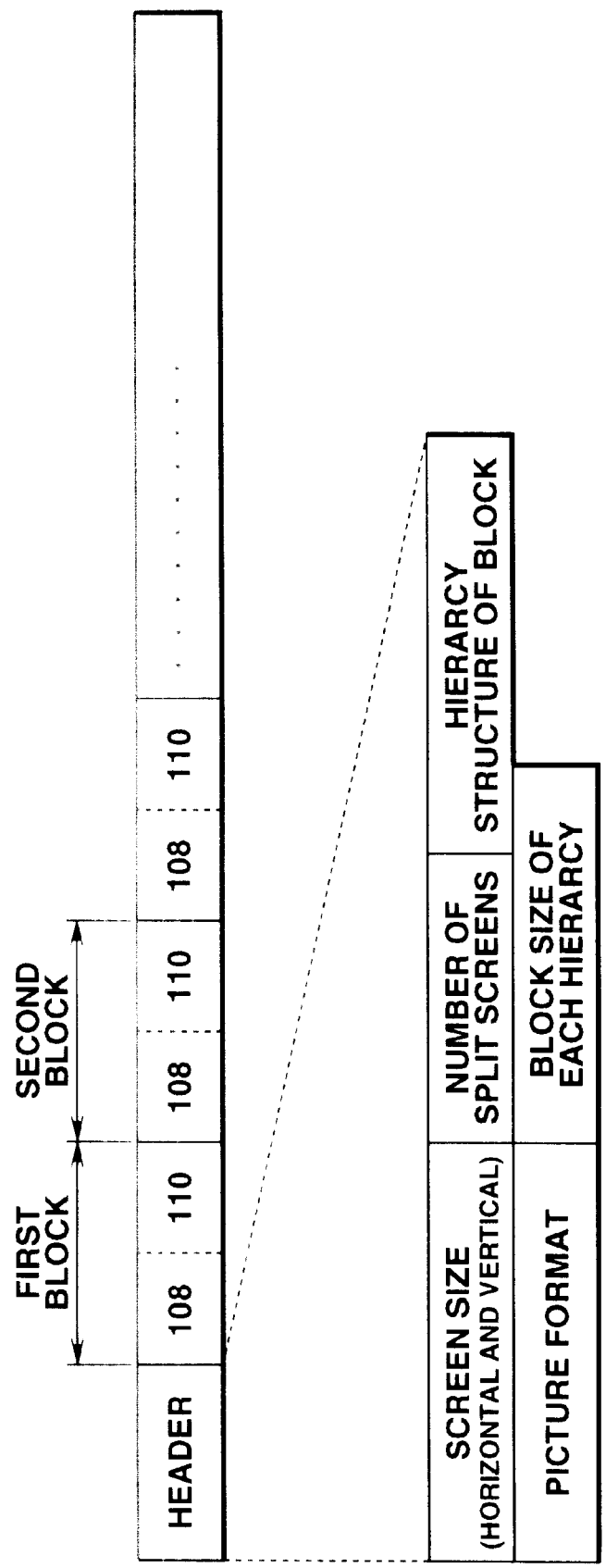
FIG. 15 depicts an alternative structure of an encoded bit stream and header portion thereof in accordance with the invention.
Figure 16:
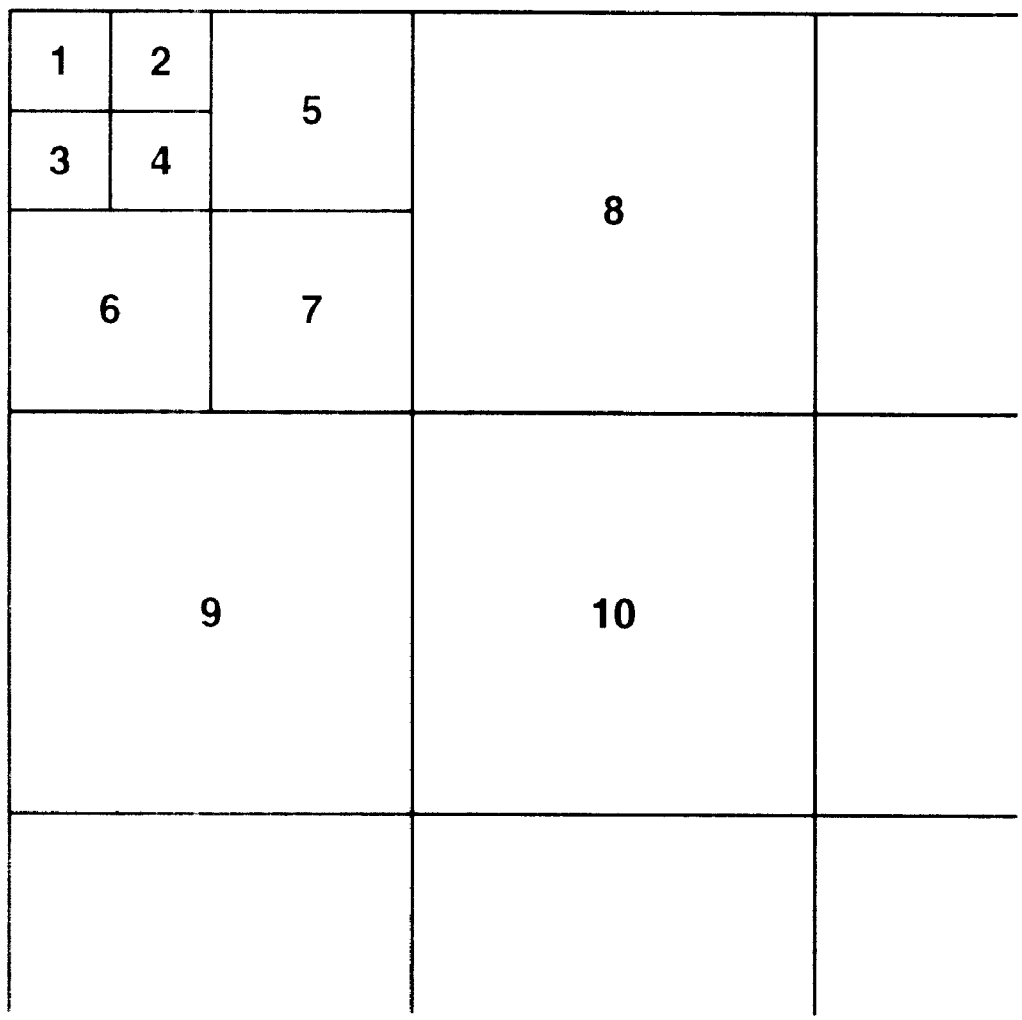
FIG. 16 depicts a block selection structure in accordance with the alternative bit stream structure of FIG. 15.

In this fifth embodiment, as well as the prior embodiments of the invention, a header of the format shown in FIG. 14 is utilized. It is assumed that the number of areas into which the screen has been divided (as shown in FIG. 2) are all equal in size. However, in accordance with the invention, the areas into which the screen is divided, or defined, need not be of the same size. By way of example, an area design such as that shown in FIG. 16 may be used as a hierarchy structure wherein four areas (1–4) are provided at a small size, three additional areas (5–7) are provided at a medium size, and three final areas (8–10) are provided at a larger size. To use such an area definition, an advanced header, such as that shown in FIG. 15, is employed. As before, the header includes information of screen size (horizontal and vertical), and a number of split screens. Since the area sizes may be different, a hierarchy structure of blocks indicating a number of a hierarchy, a picture format indicating the overall format of the picture, and information regarding the size of each block. Therefore, this hierarchy structure indicates a small block and its size definition, a medium block and its size definition and a large block and its size definition. In this manner, since the information is coded in a fixed length format, when a particular area of the picture is to be accessed, it is possible to jump directly to the portion of the bit stream containing the information for this area even though the picture areas are of different sizes, and therefore include different amounts of information. It is not necessary to read through the entire data stream as in the prior art. The enhanced header allows for the more specific tailoring of an encoding scheme for a particular image while still allowing for direct, non-sequential access to portions of the data stream.

Figure 11:
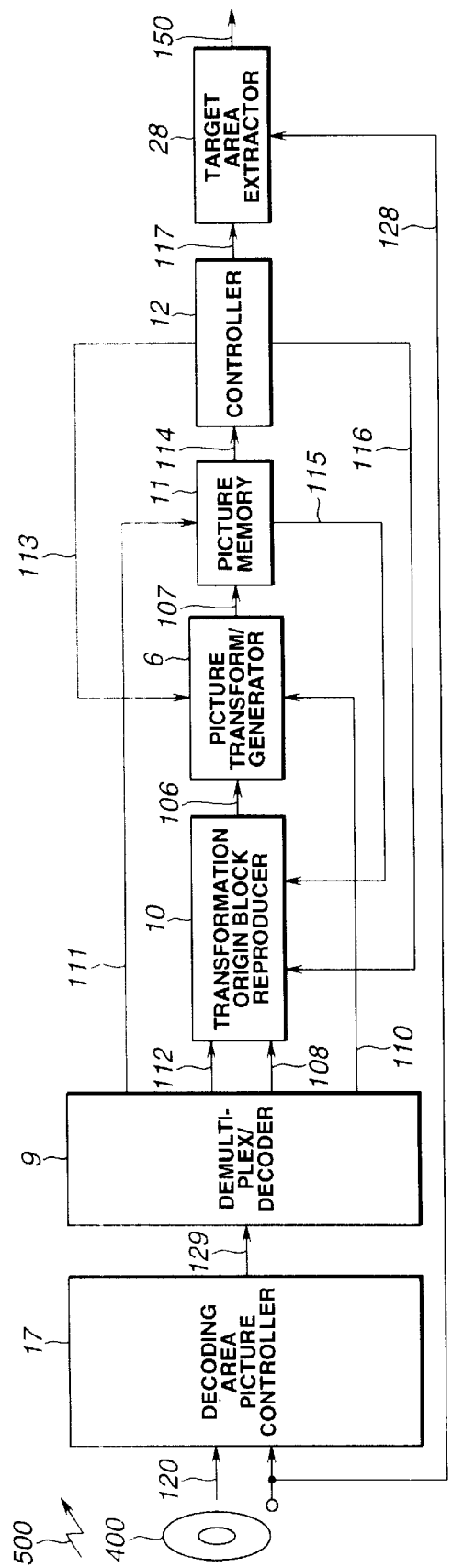
FIG. 11 is a block diagram depicting an exemplary structure of a decoding device for decoding predetermined areas of an encoded picture constructed in accordance with the invention.

Referring next to FIG. 11, a decoding apparatus constructed in accordance with the invention will now be described. This decoding apparatus may be employed for decoding information encoded by any of the iterative picture transforming coding devices explained above. A storage medium 400, a communication network 500, or other data input device provides an encoded bit stream to a decoding area picture controller 17. This decoding area picture controller 17 receives encoded bit stream 120 and decoding target area information 128 from an external input. This target area information 128 is used in controlling the portion of a picture, and thus bit stream 120, to be decoded. A demultiplex/decoder 9 for carrying out demultiplexing and decoding receives the selected portion 129 of encoded bit stream 120 and provides a number or address 111 of the first block portion 104 to be decoded to a picture memory 11 and provides a number or address 108 of the second block portion 106 corresponding to first block portion 104 and the screen splitting information 112 to a transformation origin block reproducer 10. The demultiplex/decoder also provides transformation parameters 110 to a picture transform generator 6. Transformation origin block reproducer 10 forwards a transformation origin block 106 corresponding to the provided number or address 108 of the second block portion to the picture transfer generator 6, and the picture transform generator carries out a transform on transformation origin block 106 using the provided transform parameter 110. Picture memory 11 stores a plurality of transformed block portions 107 output from picture transform generator 6, and the output of the picture memory is coupled to a controller 12 for controlling a series of iterative loops for the decoding apparatus. An area extractor 28 extracts a predetermined area from the picture to be output by the decoding device.

The operation of the decoding device shown in FIG. 11 now will be described. Storage medium 400, communication network 500, or other data input device provides an encoded bit stream 120 to the decoding area picture controller 17 to which decoding target area information 128 also is provided. The decoding area picture controller determines the portion of coded bit stream 120 corresponding to the decoding target area and outputs a decoding target coded bit stream 129 to the demultiplex/decoder 9. Thus, when the requested target area of the image to be decoded is input, decoding area picture controller determines the number of predefined areas which include portions of the image to be decoded. Each entire area that includes even one pixel that is to be displayed is decoded, even if the entire area will not be finally displayed because, as noted above with respect to the encoding apparatus, range blocks in a particular predefined area may be coded by domain blocks anywhere within that same area. Therefore, if any portion of a particular area is to be displayed, the entire area should be decoded. However, areas which do not contain any range blocks to be displayed need not be decoded by the apparatus. Thus, target coded bit stream 129 includes data corresponding only to the predefined areas of encoded bit stream 120 that are to be decoded.

Target coded bit stream 129 is demultiplexed and fixed length decoded by the demultiplex/decoder 9 and the number or address 111 of a first block portion 104 that is positioned within the area indicated by the target coded bit stream, i.e. which includes information to be decoded and displayed, is provided to the picture memory 11. Screen splitting information 112 and the number or address 108 of a second block portion 106 are provided to the transformation origin block reproducer 10. A demultiplexed transformation parameter 110 is provided to the picture transform generator 6. The transformation origin block reproducer 10 determines, by the position of the second block portion in the screen (based on the number or address 108 of the second block portion and the memory location for the first block portion), the transformation origin block 106 which is provided to the picture transform generator 6 and is transformed thereby in accordance with transform parameter 110.

A transformed block portion 107 thus obtained from picture transform generator 6 is provided to and stored in picture memory 11 at a position designated by the number or address 111 of the first block portion. This procedure is repeated until the entire decoding target coded bit stream has been read out, and all of the second transformed block portions 107 have been written into the picture memory. Then, this picture information is fed back to transformation origin block producer 10 under the control of controller 12 which couples a control signal 116 to the transformation origin block reproducer. Thus, the IFS decoding procedure is performed on only the transformed second block portions stored in picture memory 11 in an iterative, recursive procedure for a predetermined number of iterations. After the predetermined number of iterations have been performed, the finally decoded picture 117 is provided from controller 12 to target area extractor 28 which selects and displays only the portion of the picture designated by the decoding target area information 128 and outputs this selected information as an output picture 150. It should be appreciated that while less than the entire picture need be decoded, more than the final display is likely to be decoded. For example, if a user wishes to display a portion of a picture in area 1, and a portion of a picture in an area 2, the entire area 1 and area 2 are decoded, but areas 3, 4 and any subsequent areas need not be decoded.

Figure 12:
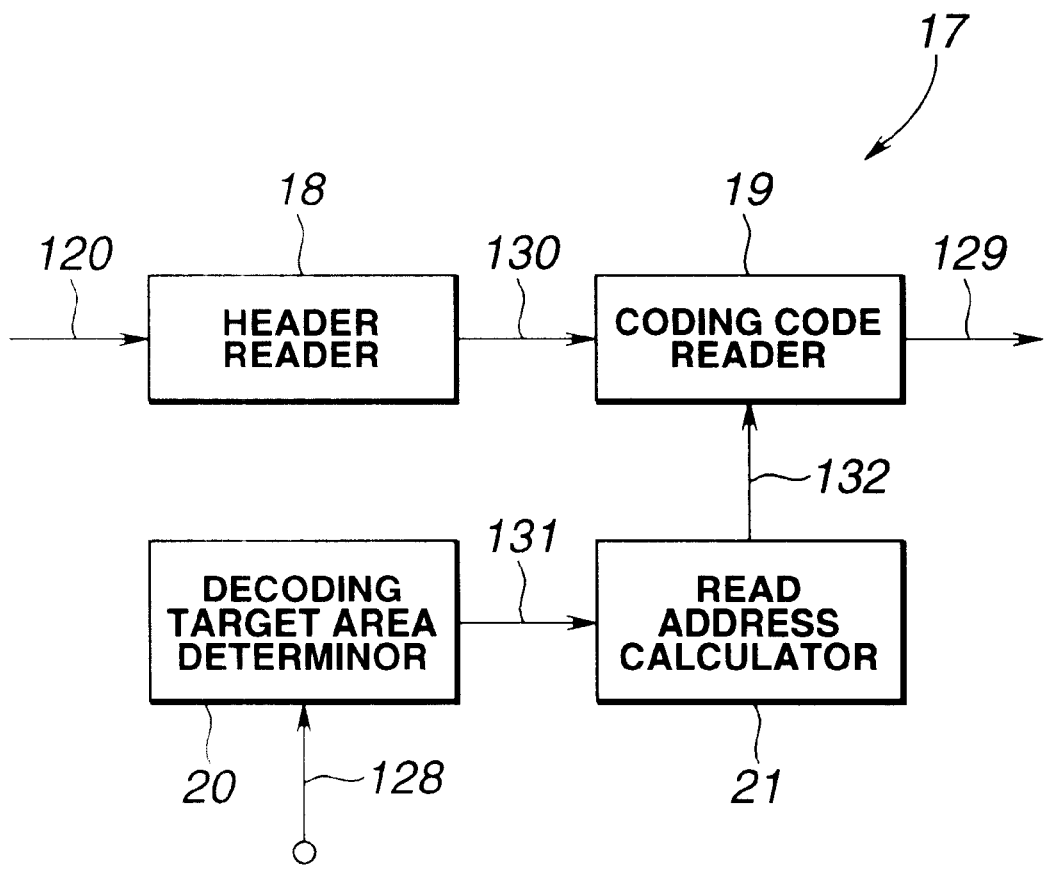
FIG. 12 is a block diagram depicting the internal structure of the decoding picture area controller of FIG. 11.

The decoding area picture controller 17 of the decoding device of the invention will now be described making reference to FIG. 12. As is shown in FIG. 12, the decoding area picture controller 17 includes a header reader 18 for reading a header from the encoded bit stream 120, a coding code reader 19 for reading a coding code including the read address information from the encoded bit stream 130 supplied from the header reader, and a decoding target area determiner 20 for receiving the decoding target area information 128 to determine a decoding area in the screen image and provide decoding target block picture information 131 to a read address calculator 21. Read address calculator 21 calculates the read address of information from that portion of encoded bit stream 120 corresponding to the portion of an image to be decoded and provides the read address information 132 to decoding code reader 19.

Figure 17:
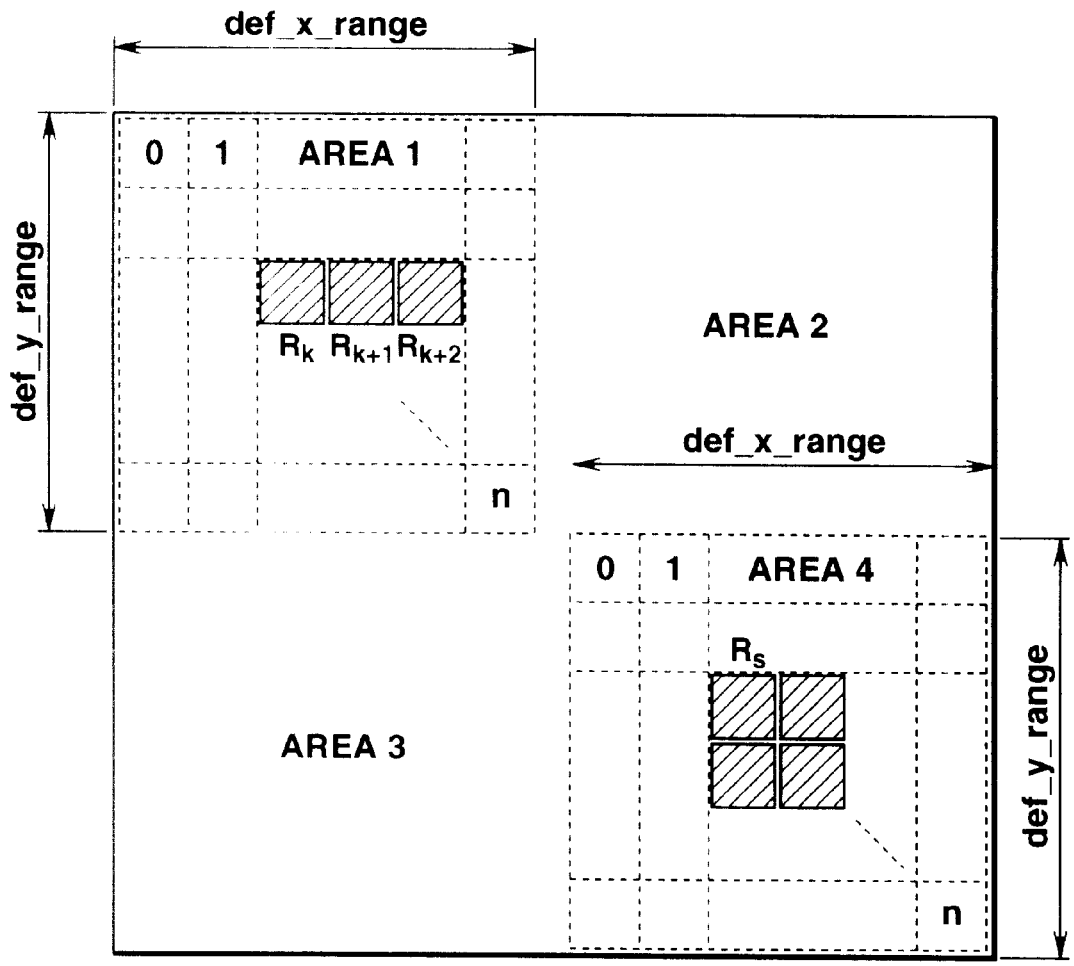
FIG. 17 depicts the mapping between a range block and a domain block for a predetermined area of an encoded picture in accordance with the invention.

The operation of the decoding area picture controller 17 will now be described making further reference to the flow chart of FIG. 13. In the first step, S31, header reader 18 receives encoded bit stream 120 and extracts the header therefrom. As shown in FIG. 14, and previously described above, this header includes screen size information, information indicating the number of split screens, and information indicating the sizes of first and second blocks. Alternatively, the header could include the information shown in FIG. 15 if the areas of the picture have a hierarchy structure. Thereafter, the operation continues at step S32 whereby the decoding target area determiner 20, to which the decoding target area information 128 has been input, determines the areas of the picture that are to be decoded, i.e., those areas of the picture which contain at least one pixel that eventually is to be displayed as an output picture. By way of example, as shown in FIG. 17, three range blocks $R_k$, $R_{k+1}$ and $R_{k+2}$ indicated by crosshatch, are located in area 1 and are to be decoded. As has been described above, these three range blocks (first blocks) are generated by mapping transformed domain blocks (second blocks) positioned within the same area 1. Thus, in order to decode the picture data set forth in the three range blocks $R_k$, $R_{k+1}$ and $R_{k+2}$, all of domain blocks within area 1 only need be decoded, but the domain blocks in other areas of the picture need not be decoded. Similarly, to decode the four indicated range blocks in area 4, all of the domain blocks within only area 4 need be decoded.

The operation then proceeds to step S33 whereat the decoding target area determined by the decoding target area determiner 20, which includes the addresses of picture information of all of the range blocks within area 1, is provided to the read address calculator 21, where the location of each code within coded bit stream that corresponds to the decoding target area for each range block to be decoded is calculated and output as read address information 132. Operation proceeds to step S34 in which decoding reader 19 uses the read address information to read out the codes of all the range blocks in area 1 which are to become the decoded target area. The operation then proceeds to step S35 (this operation is performed by demultiplexer/decoding) whereat the target coded bit stream 129 corresponding to the particular area of the picture to be decoded is decoded, and the decoded data is output from demultiplex/decoder 9. As is shown in FIG. 14, the coding code following the header includes only the number or address 108 of the second block portion, and the transform parameter 110 associated therewith for each first block portion. Therefore, by carrying out fixed length coding on the number or address and the transform parameter of each second block at the coding side, the position in the coded bit stream of the coding code for a particular first block portion may be instantly calculated and accessed. As was the case with encoding, decoding may be implemented in a general purpose computer. The embodiment of decoding in a general purpose computer will be described with respect to the flowchart of FIG. 18.

Figure 18:
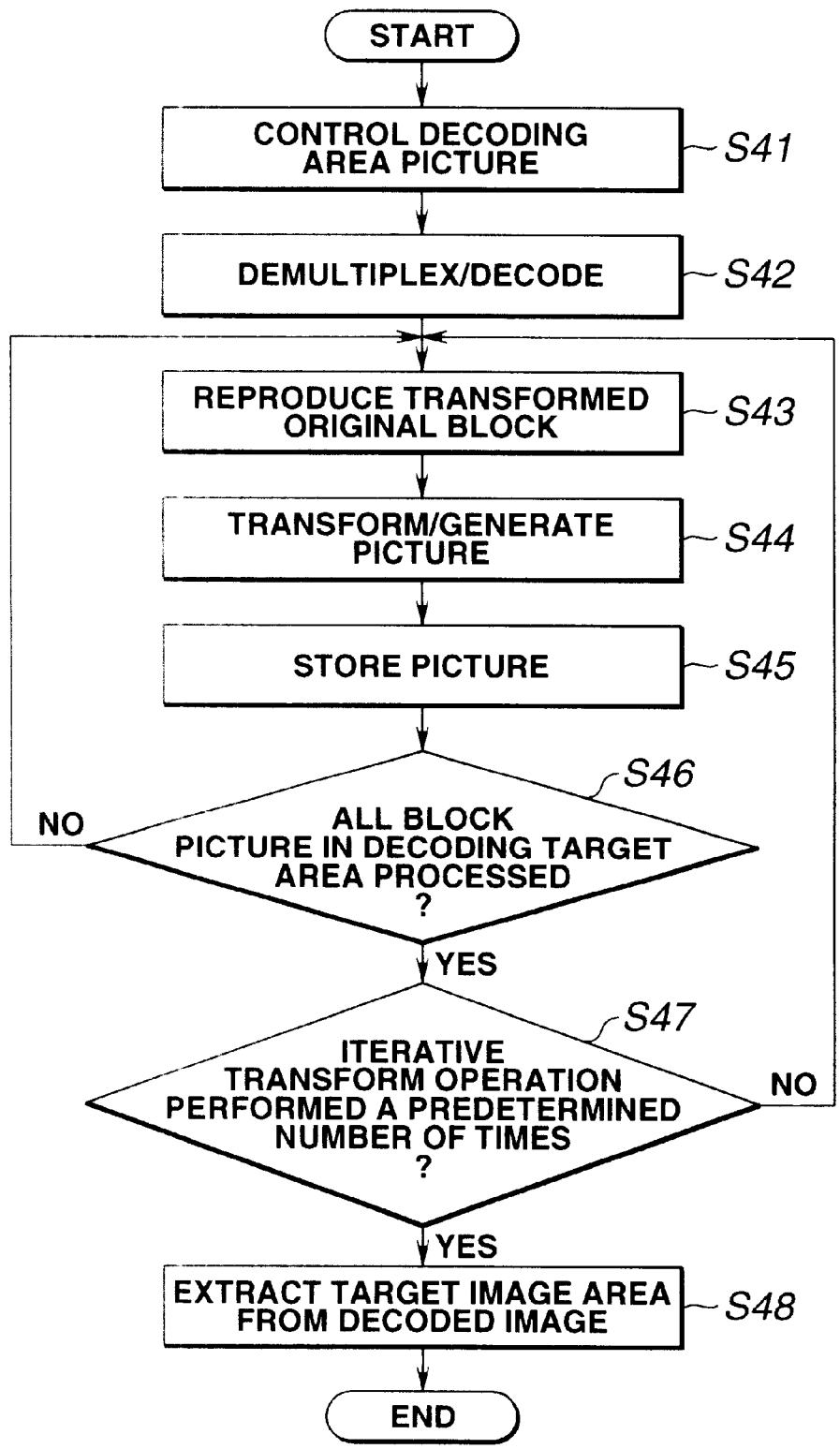
FIG. 18 is a flow chart showing a series of steps of the decoding method in accordance with the invention.
Figure 19:
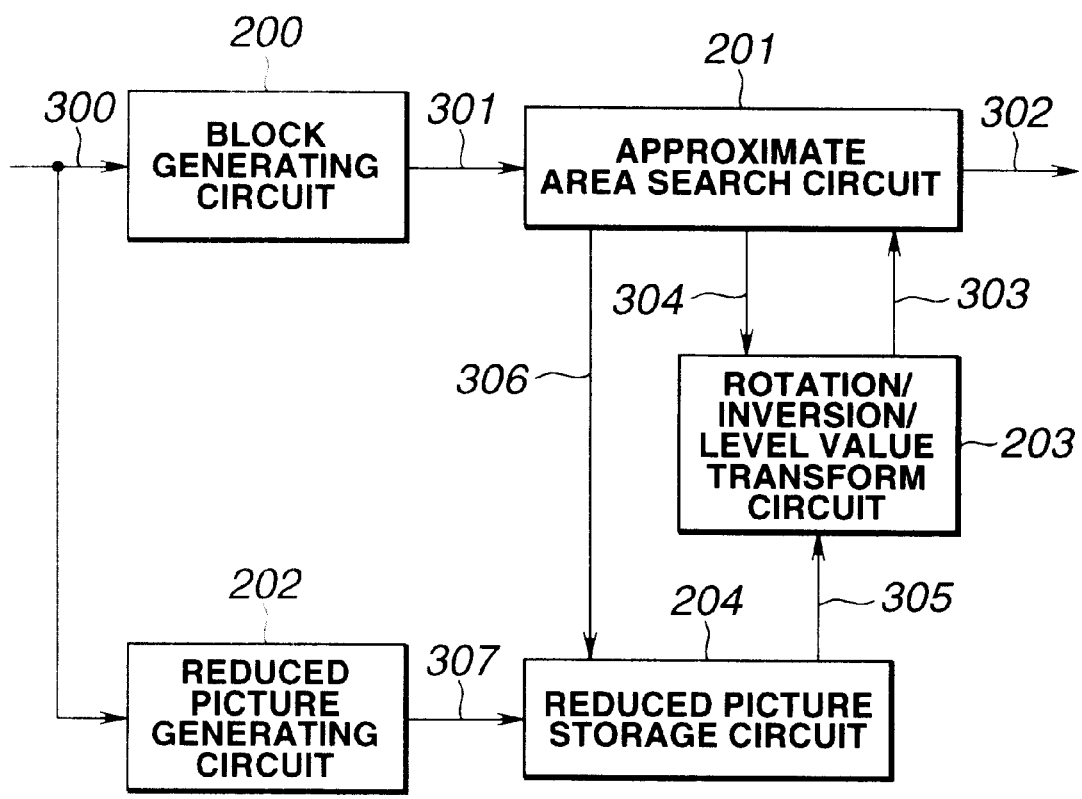
FIG. 19 is a block diagram depicting the structure of a conventional, prior art encoding device.
Figure 20:
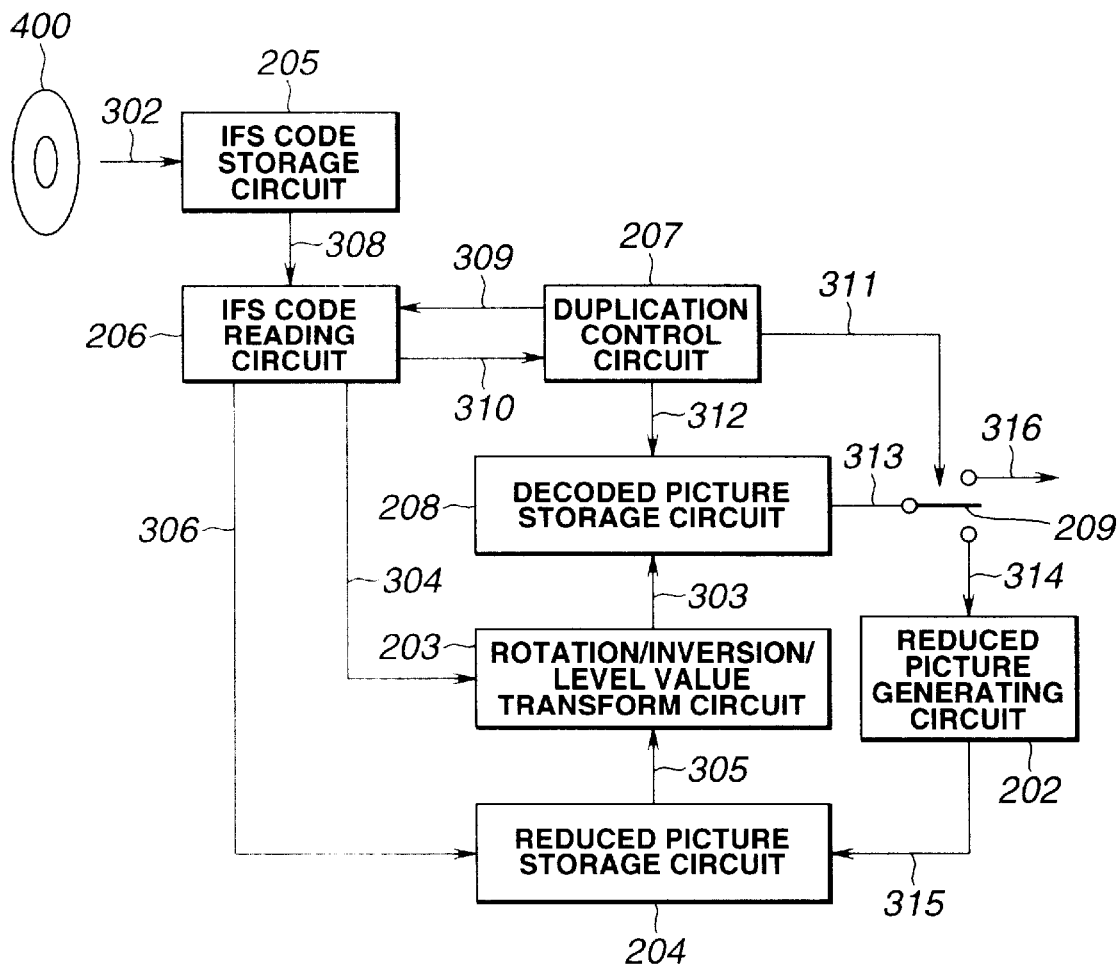
FIG. 20 is a block diagram depicting the structure of a conventional, prior art decoding device.

At the first step, S41, of FIG. 18, decoding target area information is input and the coded bit stream including only information corresponding to the areas of the picture to be decoded based on the decoding target area information is extracted. At the subsequent step S42, the coded bit stream extracted at step S41 and the header associated therewith are demultiplexed and fixed length decoded, and a number of addresses of first block portions, a number of addresses of associated second block portions and the transform parameter for each second block portion, and screen splitting information are demultiplexed. The operation then proceeds to step S43 where the transformation origin block portion (second block portion) for positioning an eventual transformed second block portion is reproduced on the basis of the number or address of second block portions obtained at step S42. At the subsequent step S44, a second block portion is transformed/generated on the basis of the transform parameter obtained at step S42 and the transformation origin block portion obtained at step S43. The operation then proceeds to step S45 wherein the block portion transformed at step S44 is stored at the address indicated by the number or address of the first block portion.

The operation then proceeds to inquiry S46 which determines whether all of the first block portions in the decoding target area have been decoded. If all of the first block portions have not been decoded, operation reverts to step S43, and the next original transform block portion for the next first block portion is reproduced. Otherwise, if all of the first block portions have been decoded, the operation proceeds to inquiry S47 to determine whether or not the iterated transform operation has been performed a predetermined number of times. If not, the operation again reverts to step S43 and the aforedescribed operation is performed again. Otherwise, operation proceeds to step S48, in which the image of the target area which is requested to be displayed by a user is extracted from the decoded image, and the extracted image is output as a final decoded image.

The local memory section 116 of the embodiment of the encoding device shown in FIG. 7 and the local memory section 27 of the area iterated function coder of the fourth embodiment shown in FIG. 9 will now be described, making further reference to FIG. 21.

Since these local memories are frequently accessed, a high-speed memory such as SDRAM (synchronous dynamic random access memory) may be used. Alternatively, a cache memory may be used.

Figure 21:
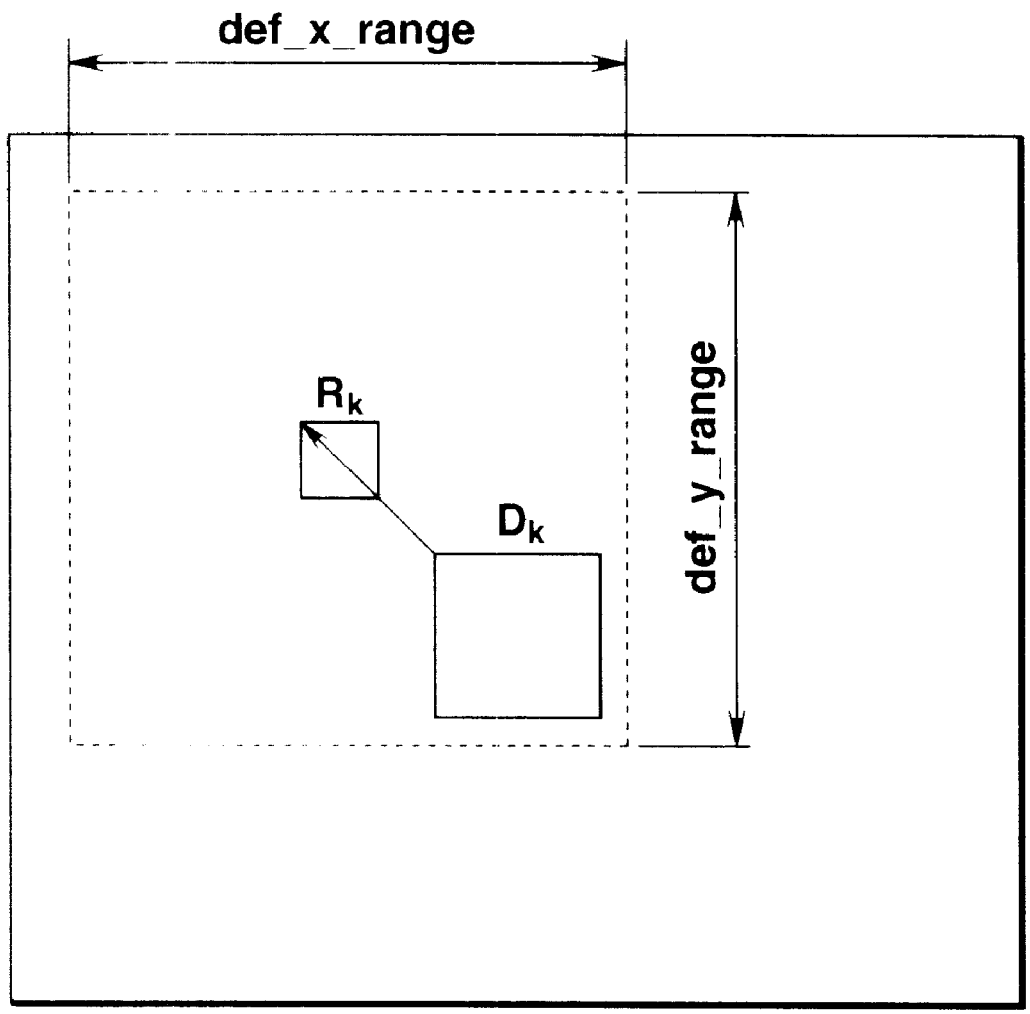
FIG. 21 depicts the mapping between a range block and a domain block for a local memory.

The storage capacity for the local memory may be determined by, for example, the values of def_x_range (pixel) in the lateral direction and def_y_range (row) in the longitudinal direction in FIG. 21. If a first block picture $R_x$ is the current coding target block, a second block picture Dk is the reference block that is searched. In this case, since the number or address of the second block picture Dk is searched for only in the area determined by the broken line, the number of target blocks is smaller than in the case where the entire screen is used as the target. As a result, the bit length required for coding the number of addresses of the second block picture may be reduced. Thus, by dividing the picture into areas to be searched, since the search range is narrowed in the encoding device, the processing time is significantly reduced.

Figure 13:
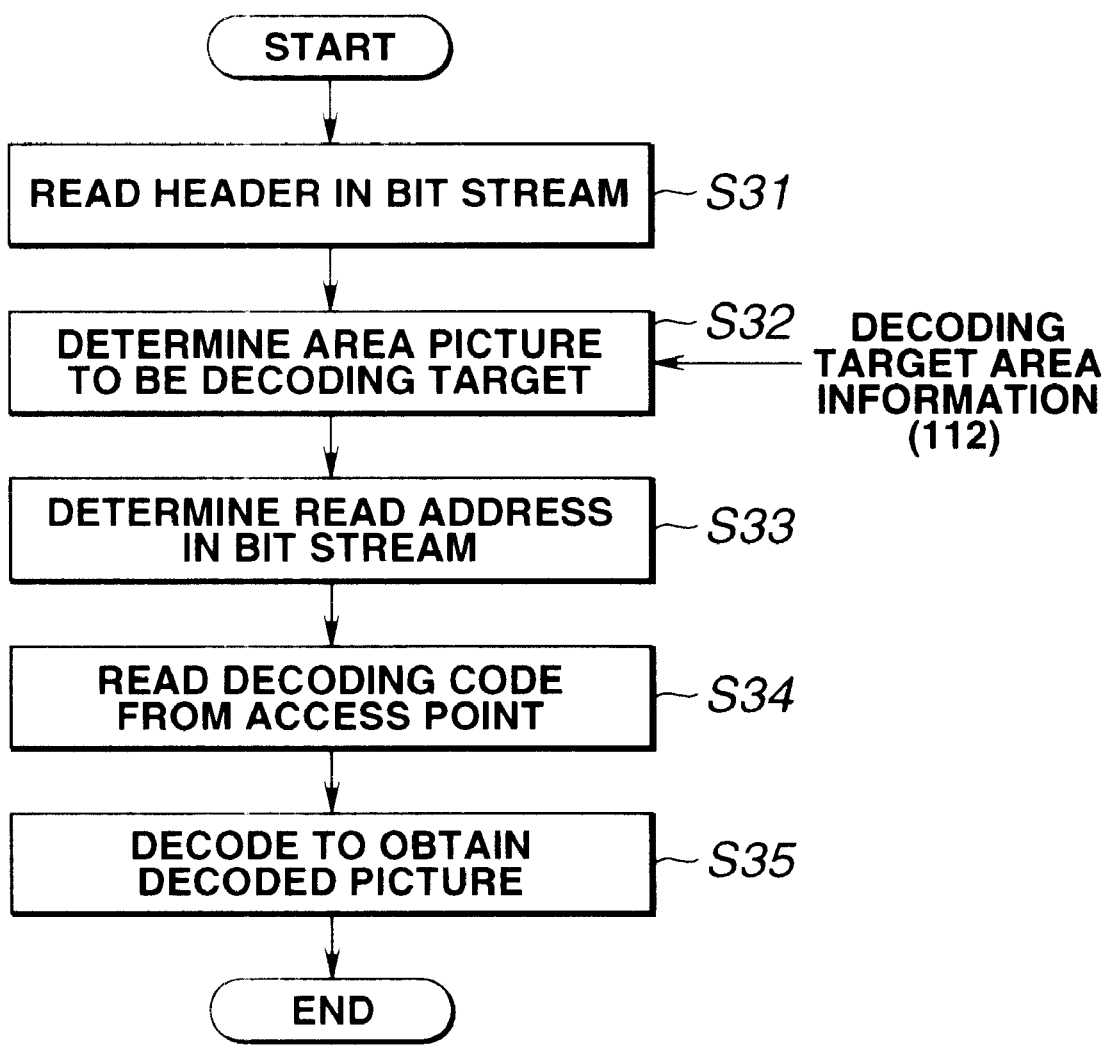
FIG. 13 is a flowchart showing a decoding method for decoding predetermined areas of an encoded picture in accordance with the invention.

A recording medium for storing a computer program so as to encode and decode in accordance with the invention, includes instructions for implementing the encoding technique set forth in FIG. 10, and the decoding technique set forth in the flowchart of FIG. 13. A specific example of such media includes a digital video disk. Examples of applications of the present invention include a picture transmitting/receiving device, a picture data base, a picture compressing/decoding device for the purpose of down-loading image information from the internet, an electronic still camera, a game machine, an encoding/decoding device having a display unit which enables variable size display, a text compression restoring section in a picture editing device, an authoring tool or a high-speed rendering chip, as well as software realizing the same.

When selecting the transformed second block most similar to the first block, not only threshold processing, but also minimum value detection are performed. Thus, nod only should a second block produce less than a predetermined error, but it also should produce an error smaller than all of the other second blocks. But, as an alternative embodiment, only threshold processing need be performed. In this case, when an error is found that is less than a threshold value, the second block/resulting in that error is used, and no further searching need be performed. While matching precision may be reduced, processing time is reduced.

As described above, the encoding technique according to the present invention maps a transform between a range block and a domain block in an area generated by splitting the screen into a plurality of equal, or unequal areas. By splitting the screen into a large number of areas, the size of each area picture may be reduced. As a result, since the area picture size to which a decoding target picture belongs is small, the decoding time and the decoder memory capacity may be reduced.

In the decoding technique according to the present invention, only the encoded data corresponding to the block portions in a target area to be decoded need be read out from the bit stream. Therefore, it is not necessary to read the entire coded bit stream from the leading part thereof as in the conventional technique, and the decoding processing time may be reduced.

It will thus be seen that the objects set forth above, among those made apparent from the preceding description, are efficiently obtained and, since certain changes may be made in carrying out the above method and in the constructions set forth without departing from the spirit and scope of the invention, it is intended that all matter contained in the above description and shown in the accompanying drawings be interpreted as illustrative and not in a limiting sense.

It is also to be understood that the following claims are intended to cover all the generic and specific features of the invention herein described, and all statements of the scope of the invention which, as a matter of language, might be said to fall therein.

I claim:

1. A method for encoding an image comprising the steps of:
   splitting an input image into a plurality of first block portions;
   splitting the input image into a plurality of second block portions;
   performing transform processing on each second block portion to generate a plurality of transformed block portions;
   determining a transformed block portion most similar to a preselected first block portion from plural ones of said transformed block portions located in a same predefined area of said input image as said preselected first block;
   selecting the second block portion corresponding to the determined transformed block portion;
   repeating the steps of determining a transformed block portion most similar to a preselected first block portion and selecting the second block portion corresponding to the determined transformed block portion for all other second block portions making up said predefined area of said input image; and
   outputting as a fixed length code, block position information indicating a position of the selected second block portion, a transformation parameter representing the transform processing of the selected second block portion, block position information indicating a position of each first block portion, and the sizes of the first and second block portions.

2. The method according to claim 1 further comprising the step of splitting the input image into a plurality of areas, wherein said predefined area corresponds to one of the plurality of areas.

3. The method according to claim 2, further comprising the step of generating header information including area information for specifying one of the plurality of areas and wherein said outputting step outputs the code with the header information.

4. The method according to claim 1, further comprising the step of storing an image of the predefined area in a local memory.

5. A method for decoding encoded data comprising a plurality of fixed length codes, said method comprising the steps of:
   receiving block position information indicating a position of each of a plurality of transformation origin blocks and a corresponding transformation parameter making up a predefined area, and obtained by iterated transformation coding a block using only said predefined area of an image; and
   recursively performing transformation processing on a block of said fixed length codes indicated by the block position information until a predetermined condition is met for each block to be decoded within said predefined area of said image, said transformation processing being based on said transformation parameter.

6. The method according to claim 5, wherein the predefined area corresponds to an area obtained by splitting the image into a plurality of areas.

7. The method according to claim 5, further comprising the step of:
   receiving information indicating an area of said image to be decoded.

8. The method according to claim 5, wherein the coded data includes header information including information specifying a plurality of areas obtained by splitting the image, and wherein the transformation process is performed in accordance with the header information.

9. An apparatus for encoding an image comprising:
   a first splitter for splitting an input image into a plurality of first block portions;
   a second splitter for splitting the input image into a plurality of second block portions;
   a transformer for performing transform processing on each second block portion to generate a plurality of transformed block portions;
   a determiner for determining a transformed block portion most similar to a preselected first block portion from plural ones of said transformed block portions located in a same predefined area of said input image as said preselected first block;
   a selector for selecting the second block portion corresponding to the determined transformed block portion, said apparatus repeatedly employing said determiner and said selector for all other second block portions making up said predefined area of said input image; and
   an output for outputting as a fixed length code, block position information indicating a position of the selected second block portion, a transformation parameter representing the transform processing of the selected second block portion, block position information indicating a position of each first block portion, and the sizes of the first and second block portions.

10. The apparatus according to claim 9, further comprising an area splitter for splitting the input image into a plurality of areas, wherein said predefined area corresponds to one of the plurality of areas.

11. The apparatus according to claim 10, further comprising a header generator for generating header information including area information for specifying one of the plurality of areas, and wherein said output outputs the code with the header information.

12. The apparatus according to claim 9, further comprising a local memory for storing an image of the predefined area.

13. An apparatus for decoding encoded data comprising a plurality of fixed length codes, comprising:

a receiver for receiving block position information indicating a position of each of a plurality of transformation origin blocks and a corresponding transformation parameter making up a predefined area, and obtained by iterated transformation coding a block using only said predefined area of an image; and a transformer for recursively performing transformation processing on a block of said fixed length codes indicated by the block position information until a predetermined condition is met for each block to be decoded within said predefined area of said image, said transformation processing being based on said transformation parameter.

14. The apparatus according to claim 13, wherein the predefined area corresponds to an area obtained by splitting the image into a plurality of areas.

15. The apparatus according to claim 13, further comprising:

an area determiner for receiving information indicating an area of said image to be decoded.

16. The apparatus according to claim 13, wherein the coded data includes header information including information specifying a plurality of areas obtained by splitting the image, and wherein the transformer performs the transformation processing in accordance with the header information.

17. An apparatus for encoding an image comprising:

first splitter means for splitting an input image into a plurality of first block portions;

second splitter means for splitting the input image into a plurality of second block portions;

transformer means for performing transform processing on each second block portion to generate a plurality of transformed block portions;

determination means for determining a transformed block portion most similar to a preselected first block portion from plural ones of said transformed block portions located in a same predefined area of said input image as said preselected first block;

selection means for selecting the second block portion corresponding to the determined transformed block portion, said apparatus repeatedly employing said determination means and said selection means for all other second block portions making up said predefined area of said input image; and output means for outputting as a fixed length code, block position information indicating a position of the selected second block portion, a transformation parameter representing the transform processing of the selected second block portion, block position information indicating a position of each first block portion, and the sizes of the first and second block portions.

18. The apparatus according to claim 17, further comprising area splitting means for splitting the input image into a plurality of areas, wherein said predefined area corresponds to one of the plurality of areas.

19. The apparatus according to claim 18, further comprising header generating means for generating header information including area information for specifying one of the plurality of areas, and wherein said output means outputs the code with the header information.

20. The apparatus according to claim 17, further comprising local memory means for storing an image of the predefined area.

21. An apparatus for decoding encoded data comprising a plurality of fixed length codes, comprising:

receiver means for receiving block position information indicating a position of each of a plurality of transformation origin blocks and a corresponding transformation parameter making up a predefined area, and obtained by iterated transformation coding a block using only said predefined area of an image; and transformation means for recursively performing transformation processing on a block of said fixed length codes indicated by the block position information until a predetermined, condition is met for each block to be decoded within said predefined area of said image, said transformation processing being based on said transformation parameter.

22. The apparatus according to claim 21, wherein the predefined area corresponds to an area obtained by splitting the image into a plurality of areas.

23. The apparatus according to claim 21, further comprising:

area determination means for receiving information indicating an area of said image to be decoded.

24. The apparatus according to claim 21, wherein the coded data includes header information including information specifying a plurality of areas obtained by splitting the image, and wherein the transformation means performs the transformation processing in accordance with the header information.

25. A record medium decodable by a decoding device, the record medium having recorded thereon a recorded signal including coded data comprising a plurality of fixed length codes, each code including block position information indicating the position of each of a plurality of respective transformation origin blocks and a corresponding transformation parameter making up a predefined area obtained by iterated transformation coding a block using only said predetermined area of an image, and the recorded signal being decoded by the steps of:

reading said block position information and said transformation parameter, and recursively performing transformation processing on the respective block of said fixed length codes indicated by the block position information and based on said transformation parameter until a predetermined condition is met for each block to be decoded within said predetermined area of said image.

26. A record medium having recorded thereon a decoding program for producing a decoded image from coded data comprising a plurality of fixed length codes, each code including block position information indicating the positions of each of a plurality of respective transformation origin blocks and a corresponding transformation parameter making up a predefined area, and obtained by iterated transformation coding a block using only said predetermined area of an image, said decoding program being operable to:

receive block position information included in said coded data and a transformation parameter also included in said coded data, and recursively perform transformation processing on the respective block of said fixed length codes indicated by the block position information and based on said transformation parameter until a predetermined condition is met for each block to be decoded within said predetermined area of said image.

* * * * *